United States Patent
Krips et al.

(10) Patent No.: US 12,506,644 B2
(45) Date of Patent: Dec. 23, 2025

(54) REFERENCE SIGNAL FORMATION FOR PRECODING RESOURCE BLOCK GROUPS

(71) Applicant: QUALCOMM Incorporated, San Diego, CA (US)

(72) Inventors: Ram Krips, Ramat Gan (IL); Assaf Touboul, Netanya (IL); Gideon Shlomo Kutz, Ramat Hasharon (IL); Amit Bar-Or Tillinger, Tel-Aviv (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 18/307,290

(22) Filed: Apr. 26, 2023

(65) Prior Publication Data

US 2024/0372752 A1 Nov. 7, 2024

(51) Int. Cl.
*H04L 5/00* (2006.01)
*H04B 17/309* (2015.01)
*H04L 25/02* (2006.01)
*H04W 72/23* (2023.01)

(52) U.S. Cl.
CPC ........ *H04L 25/0228* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2018/0235025 A1* | 8/2018 | Chen | H04W 72/0453 |
| 2019/0190572 A1* | 6/2019 | Osawa | H04W 72/23 |
| 2020/0015275 A1* | 1/2020 | Kim | H04J 11/00 |
| 2020/0052866 A1* | 2/2020 | Manolakos | H04L 5/00 |
| 2021/0068087 A1* | 3/2021 | Shi | H04W 72/542 |

(Continued)

OTHER PUBLICATIONS

Huawei, et al., "Enhancements on DMRS in Re1-18", 3GPP TSG-RAN WG1 Meeting #110bis-e, R1-2208442, 3rd Generation Partnership Project, Mobile Competence Centre, 650, Route Des Lucioles, F-06921 Sophia-Antipolis Cedex, France, vol. RAN WG1, No. e-Meeting Oct. 10, 2022-Oct. 19, 2022, 26 Pages, Sep. 30, 2022, XP052276367, pp. 1-3.

(Continued)

*Primary Examiner* — Duc T Duong
(74) *Attorney, Agent, or Firm* — Holland & Hart LLP

(57) ABSTRACT

Methods, systems, and devices for wireless communications are described. The method may include a user equipment (UE) transmitting a capability message indicating a capability of the UE to support a positioning scheme for one or more reference signals within a precoding resource block group for a channel estimation procedure, receiving, based on the capability message, a control signal indicating a frequency allocation for the one or more reference signals for the channel estimation procedure, the frequency allocation for the one or more reference signals being based on the positioning scheme supported by the UE, receiving the one or more reference signals for the channel estimation procedure in accordance with the frequency allocation, and performing the channel estimation procedure using the one or more reference signals based on the precoding resource block group associated with the channel estimation procedure.

30 Claims, 19 Drawing Sheets

(56) References Cited

U.S. PATENT DOCUMENTS

| | | | | |
|---|---|---|---|---|
| 2021/0152303 A1* | 5/2021 | Hao | ............... | H04L 5/0053 |
| 2021/0360510 A1* | 11/2021 | Zheng | ............... | H04L 5/0012 |
| 2022/0224484 A1* | 7/2022 | Yi | ............... | H04L 5/0044 |
| 2022/0271900 A1* | 8/2022 | Liu | ............... | H04L 5/0078 |
| 2023/0217429 A1* | 7/2023 | Faxér | ............... | H04L 5/0051 |
| | | | | 370/329 |
| 2023/0246774 A1* | 8/2023 | Gao | ............... | H04L 5/001 |
| | | | | 370/329 |
| 2025/0193911 A1* | 6/2025 | Jang | ............... | H04W 72/21 |

OTHER PUBLICATIONS

International Search Report and Written Opinion—PCT/US2024/021752—ISA/EPO—Jul. 16, 2024 (2302775WO).

Nokia, et al., "On details of DMRS Design for 2-OS DL Shorter TTI", 3GPP TSG-RAN WG1 Meeting #88b, R1-1704809, 3rd Generation Partnership Project, Mobile Competence Centre, 650, Route Des Lucioles, F-06921 Sophia-Antipolis Cedex, vol. RAN WG1, No. Athens, Greece, Feb. 13, 2017-2017021, Apr. 2, 2017, 8 Pages, XP051242945, pp. 1-2, pp. 6-7.

* cited by examiner 305-a 305-b

Port 1/2 OCC 310    Port 3/4 OCC 315

Port 1-4 OCC 320

Port 5/6 OCC 325    Port 1-6 OCC 330

300

Port 1/2 OCC 410

Port 3/4 OCC 415

Port 1-4 OCC 420

Port 5/6 OCC 425

Port 1-6 OCC 430

REFERENCE SIGNAL FORMATION FOR PRECODING RESOURCE BLOCK GROUPS

TECHNICAL FIELD

The following relates to wireless communications, including reference signal formation for precoding resource block groups.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reference signal formation for precoding resource block groups. In some examples, a user equipment (UE) may receive control signaling (e.g., downlink control information (DCI)) from a network entity indicating a frequency allocation for one or more reference signals (e.g., demodulation reference signals (DMRS)) to be transmitted within a precoding resource block group (PRG). The UE may receive DMRS for performing a channel estimation procedure on one or more subcarriers of the PRG based on the frequency allocation. The DMRS may be Type 1 (e.g., supports up to four DMRS ports) or Type 2 (e.g., supports up to six DMRS ports). The PRG may support a single layer or multiple layers based on the number (e.g., quantity) of DMRS ports associated with the PRG. In some examples, the PRG may be configured to include a DMRS on each edge subcarrier (e.g., a first subcarrier and a last subcarrier of the PRG) and a first pair of DMRS separated by a single subcarrier. The PRG may be further configured to include a second pair of DMRS separated by two subcarriers or a second pair of DMRS in the precoding resource block group to be received on adjacent subcarriers to avoid channel estimation extrapolation at the edges of the PRG. In some other examples, the PRG may be configured with a DMRS in the first subcarrier of the PRG and may be further configured to include an additional DMRS in the last subcarrier to avoid channel estimation extrapolation at the edge of the PRG. In some cases where the PRG is associated with 2-4 layers (e.g., between two and four ports), the PRG may be configured so that port positioning within a group of subcarriers of the PRG and any subsequent PRGs is inverted.

A method for wireless communications at a UE is described. The method may include transmitting a capability message indicating a capability of the UE to support a positioning scheme for one or more reference signals within a PRG for a channel estimation procedure, receiving, based on the capability message, a control signal indicating a frequency allocation for the one or more reference signals for the channel estimation procedure, the frequency allocation for the one or more reference signals being based on the positioning scheme supported by the UE, receiving the one or more reference signals for the channel estimation procedure in accordance with the frequency allocation, and performing the channel estimation procedure using the one or more reference signals based on the PRG associated with the channel estimation procedure.

An apparatus for wireless communications at a UE is described. The apparatus may include a processor, memory coupled with the processor, and instructions stored in the memory. The instructions may be executable by the processor to cause the apparatus to transmit a capability message indicating a capability of the UE to support a positioning scheme for one or more reference signals within a PRG for a channel estimation procedure, receive, based on the capability message, a control signal indicating a frequency allocation for the one or more reference signals for the channel estimation procedure, the frequency allocation for the one or more reference signals being based on the positioning scheme supported by the UE, receive the one or more reference signals for the channel estimation procedure in accordance with the frequency allocation, and perform the channel estimation procedure using the one or more reference signals based on the PRG associated with the channel estimation procedure.

Another apparatus for wireless communications at a UE is described. The apparatus may include means for transmitting a capability message indicating a capability of the UE to support a positioning scheme for one or more reference signals within a PRG for a channel estimation procedure, means for receiving, based on the capability message, a control signal indicating a frequency allocation for the one or more reference signals for the channel estimation procedure, the frequency allocation for the one or more reference signals being based on the positioning scheme supported by the UE, means for receiving the one or more reference signals for the channel estimation procedure in accordance with the frequency allocation, and means for performing the channel estimation procedure using the one or more reference signals based on the PRG associated with the channel estimation procedure.

A non-transitory computer-readable medium storing code for wireless communications at a UE is described. The code may include instructions executable by a processor to transmit a capability message indicating a capability of the UE to support a positioning scheme for one or more reference signals within a PRG for a channel estimation procedure, receive, based on the capability message, a control signal indicating a frequency allocation for the one or more reference signals for the channel estimation procedure, the frequency allocation for the one or more reference signals being based on the positioning scheme supported by the UE, receive the one or more reference signals for the channel estimation procedure in accordance with the frequency allocation, and perform the channel estimation procedure using the one or more reference signals based on the PRG associated with the channel estimation procedure.

In some examples of the method, apparatuses, and non-transitory computer-readable medium described herein, receiving the control signal may include operations, features, means, or instructions for receiving an indication of a reference signal configuration including at least one of a modified reference signal, a type of reference signal, a PRG allocation, or a combination thereof, where performing the channel estimation procedure may be based on the reference signal configuration.

Some examples of the method, apparatuses, and non-transitory computer-readable medium described herein may further include operations, features, means, or instructions for receiving a first reference signal via a first subcarrier of the PRG and a second reference signal via a last subcarrier of the PRG, where a first pair of the one or more reference signals in the PRG may be separated by a single subcarrier and a second pair of the one or more reference signals in the PRG may be separated by two subcarriers.

Some examples of the method, apparatuses, and non-transitory computer-readable medium described herein may further include operations, features, means, or instructions for receiving a first reference signal via a first subcarrier of the PRG and a second reference signal via a last subcarrier of the PRG, where a first pair of the one or more reference signals in the PRG may be separated by a single subcarrier and a second pair of the one or more reference signals in the PRG may be received via adjacent subcarriers of the PRG.

Some examples of the method, apparatuses, and non-transitory computer-readable medium described herein may further include operations, features, means, or instructions for receiving a first reference signal via a first subcarrier of the PRG and a second reference signal via a last subcarrier of the PRG, where the first reference signal and the second reference signal may be associated with an OCC.

In some examples of the method, apparatuses, and non-transitory computer-readable medium described herein, a first symbol associated with the first reference signal and a second symbol associated with the second reference signal may be mapped to a pair of ports.

Some examples of the method, apparatuses, and non-transitory computer-readable medium described herein may further include operations, features, means, or instructions for receiving the one or more reference signals via each subcarrier of the PRG, where each resource element of the PRG includes an OCC associated with three or more ports of a constellation.

Some examples of the method, apparatuses, and non-transitory computer-readable medium described herein may further include operations, features, means, or instructions for receiving a first reference signal via a first resource element of the PRG and a second reference signal via a last resource element of the PRG, where the first resource element and the last resource element each includes OCCs associated with three or more ports and remaining resource elements of the PRG include OCCs associated with at least a pair of ports.

Some examples of the method, apparatuses, and non-transitory computer-readable medium described herein may further include operations, features, means, or instructions for receiving a first reference signal via first two resource elements of the PRG and a second reference signal via last two resource elements of the PRG, where the first two resource elements and the last two resource elements each includes OCCs associated with up to six ports.

Some examples of the method, apparatuses, and non-transitory computer-readable medium described herein may further include operations, features, means, or instructions for receiving an indication to modify one or more port allocations of the PRG and performing a modification of the one or more port allocations of the PRG based on receiving the indication, where receiving the one or more reference signals may be based on performing the modification of the one or more port allocations.

In some examples of the method, apparatuses, and non-transitory computer-readable medium described herein, the positioning scheme may be based on a resource partition size for the PRG associated with the channel estimation procedure.

In some examples of the method, apparatuses, and non-transitory computer-readable medium described herein, the one or more reference signals include one or more DMRS.

A method for wireless communications at a network entity is described. The method may include receiving, to a UE, a capability message indicating a capability of the UE to support a positioning scheme for one or more reference signals within a PRG for a channel estimation procedure, transmitting, based on the capability message, a control signal indicating a frequency allocation for the one or more reference signals for the channel estimation procedure, the frequency allocation for the one or more reference signals being based on the positioning scheme supported by the UE, and transmitting the one or more reference signals for the channel estimation procedure in accordance with the frequency allocation.

An apparatus for wireless communications at a network entity is described. The apparatus may include a processor, memory coupled with the processor, and instructions stored in the memory. The instructions may be executable by the processor to cause the apparatus to receive, to a UE, a capability message indicating a capability of the UE to support a positioning scheme for one or more reference signals within a PRG for a channel estimation procedure, transmit, based on the capability message, a control signal indicating a frequency allocation for the one or more reference signals for the channel estimation procedure, the frequency allocation for the one or more reference signals being based on the positioning scheme supported by the UE, and transmit the one or more reference signals for the channel estimation procedure in accordance with the frequency allocation.

Another apparatus for wireless communications at a network entity is described. The apparatus may include means for receiving, to a UE, a capability message indicating a capability of the UE to support a positioning scheme for one or more reference signals within a PRG for a channel estimation procedure, means for transmitting, based on the capability message, a control signal indicating a frequency allocation for the one or more reference signals for the channel estimation procedure, the frequency allocation for the one or more reference signals being based on the positioning scheme supported by the UE, and means for transmitting the one or more reference signals for the channel estimation procedure in accordance with the frequency allocation.

A non-transitory computer-readable medium storing code for wireless communications at a network entity is described. The code may include instructions executable by a processor to receive, to a UE, a capability message indicating a capability of the UE to support a positioning scheme for one or more reference signals within a PRG for a channel estimation procedure, transmit, based on the capability message, a control signal indicating a frequency allocation for the one or more reference signals for the channel estimation procedure, the frequency allocation for the one or more reference signals being based on the positioning scheme supported by the UE, and transmit the one or more reference signals for the channel estimation procedure in accordance with the frequency allocation.

In some examples of the method, apparatuses, and non-transitory computer-readable medium described herein, transmitting the control signal may include operations, features, means, or instructions for transmitting an indication of a reference signal configuration including at least one of a modified reference signal, a type of reference signal, a PRG allocation, or a combination thereof, where the channel estimation procedure may be based on the reference signal configuration.

Some examples of the method, apparatuses, and non-transitory computer-readable medium described herein may further include operations, features, means, or instructions for transmitting a first reference signal via a first subcarrier of the PRG and a second reference signal via a last subcarrier of the PRG, where a first pair of the one or more reference signals in the PRG may be separated by a single subcarrier and a second pair of the one or more reference signals in the PRG may be separated by two subcarriers.

Some examples of the method, apparatuses, and non-transitory computer-readable medium described herein may further include operations, features, means, or instructions for transmitting a first reference signal via a first subcarrier of the PRG and a second reference signal via a last subcarrier of the PRG, where a first pair of the one or more reference signals in the PRG may be separated by a single subcarrier and a second pair of the one or more reference signals in the PRG may be received via adjacent subcarriers of the PRG.

Some examples of the method, apparatuses, and non-transitory computer-readable medium described herein may further include operations, features, means, or instructions for transmitting a first reference signal via a first subcarrier of the PRG and a second reference signal via a last subcarrier of the PRG, where the first reference signal and the second reference signal may be associated with an OCC.

In some examples of the method, apparatuses, and non-transitory computer-readable medium described herein, a first symbol associated with the first reference signal and a second symbol associated with the second reference signal may be mapped to a pair of ports.

Some examples of the method, apparatuses, and non-transitory computer-readable medium described herein may further include operations, features, means, or instructions for transmitting the one or more reference signals via each subcarrier of the PRG, where each resource element of the PRG includes an OCC associated with three or more ports of a constellation.

Some examples of the method, apparatuses, and non-transitory computer-readable medium described herein may further include operations, features, means, or instructions for transmitting a first reference signal via a first resource element of the PRG and a second reference signal via a last resource element of the PRG, where the first resource element and the last resource element each includes OCCs associated with three or more ports and remaining resource elements of the PRG include OCCs associated with at least a pair of ports.

Some examples of the method, apparatuses, and non-transitory computer-readable medium described herein may further include operations, features, means, or instructions for transmitting a first reference signal via first two resource elements of the PRG and a second reference signal via last two resource elements of the PRG, where the first two resource elements and the last two resource elements each includes OCCs associated with up to six ports.

Some examples of the method, apparatuses, and non-transitory computer-readable medium described herein may further include operations, features, means, or instructions for performing a modification of one or more port allocations of the PRG and transmitting an indication of the modification of the one or more port allocations based on performing the modification, where transmitting the one or more reference signals may be based on the modification of the one or more port allocations.

In some examples of the method, apparatuses, and non-transitory computer-readable medium described herein, the positioning scheme may be based on a resource partition size for the PRG associated with the channel estimation procedure.

In some examples of the method, apparatuses, and non-transitory computer-readable medium described herein, the one or more reference signals include one or more DMRS.

DETAILED DESCRIPTION

Figure 1:
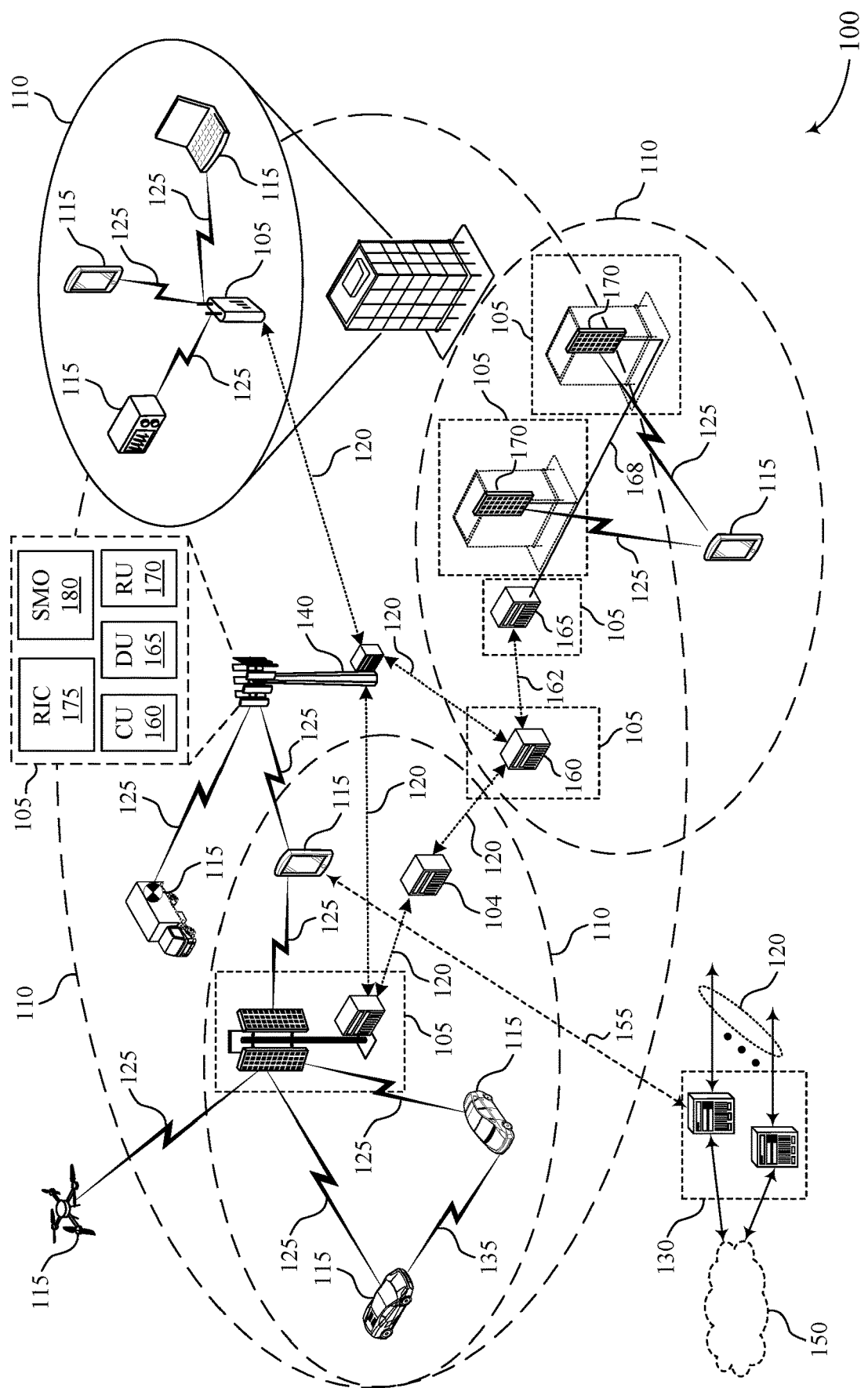
FIG. 1 shows an example of a wireless communications system that supports reference signal formation for precoding resource block groups (PRGs) in accordance with one or more aspects of the present disclosure.

Some wireless devices in a wireless communications system may communicate via frequency bandwidths that exceed a threshold bandwidth (e.g., greater than 3.1 GHz). For example, wireless devices may communicate via ultra-wideband (UWB), submillimeter waves (sub-THz), or any combination thereof, using high signal-to-noise ratio (SNR) waveforms to improve communication efficiency. High SNR waveforms may be waveforms that have a code rate or coding order above a threshold, such as waveforms associated with or supporting a high order constellation (e.g., above 4000 quadrature amplitude modulation (QAM)). Such waveforms may be referred to as super QAM waveforms. To enhance the throughput in such frequency bands, a wireless communications system may implement frequency selective precoding, which involves partitioning a frequency bandwidth into precoding resource block (RB) groups (PRGs), and a user equipment (UE) may perform channel estimation independently for each PRG. The channel estimation may be performed based on one or more demodulation reference signal (DMRS) schemes. A DMRS scheme may indicate locations (e.g., subcarriers) within a PRG that are allocated for DMRS. In some cases, A DMRS scheme may allocate equally spaced DMRSs within and for each PRG. In some cases, when the UE performs channel estimation in the middle of a frequency range associated with a PRG, the channel estimation may be based on interpolating the channel between configured DMRS symbols within a PRG, which may result in a higher quality or more accurate channel estimation. In some cases, when performing channel estimation on a PRG having a PRG size below a threshold or having a number (e.g., quantity) of RBs below a threshold number (e.g., having a 2 resource block (RB) including 24 subcarriers per PRG), the channel estimation quality may deteriorate or degrade. For example, a wireless device may perform channel estimation on multiple PRGs, and the channel estimation quality may degrade when channel estimation is performed at a PRG edge. In such cases, each PRG may be associated with a different channel, and the wireless device may not be able to interpolate the channel between DMRS symbols associated with different channels. When performing channel estimation at the PRG edge, the wireless device may perform channel estimation based on extrapolating information between a DMRS included in a last subcarrier of the PRG that is associated with a first channel and a DMRS included in a first subcarrier of a second PRG (e.g., a subsequent PRG in the frequency bandwidth) that is associated with a second channel, which may provide a more inaccurate estimation of the first channel (e.g., using old reference signals).

Various aspects of the present disclosure are related to reference signal formation for PRGs. In some examples, a UE may receive control signaling from a network entity indicating a frequency allocation for one or more reference signals (e.g., DMRS) to be transmitted within a PRG. The UE may receive DMRS for performing a channel estimation procedure based on the frequency allocation. The DMRS may be Type 1 (e.g., supports up to four DMRS ports) or Type 2 (e.g., supports up to six DMRS ports). The PRG may support a single layer or multiple layers based on the number (e.g., quantity) of DMRS ports associated with the PRG. The DMRS may be transmitted on multiple subcarriers of the PRG. In some examples, the PRG may be configured to include a DMRS on each edge subcarrier (e.g., a first subcarrier and a last subcarrier of the PRG) and a first pair of DMRS separated by a single subcarrier. The PRG may be further configured to include a second pair of DMRS separated by two subcarriers or a second pair of DMRS in the PRG to be received on adjacent subcarriers to avoid channel estimation extrapolation at the edges of the PRG. In some other examples, the PRG may be configured with a DMRS in the first subcarrier of the PRG, and may be further configured to include an additional DMRS in the last subcarrier to avoid channel estimation extrapolation at the edge of the PRG. In some cases where the PRG is associated with two to four layers (e.g., between two and four ports), the PRG may be configured so that port positioning within every other RB (e.g., group of 12 subcarriers) of the PRG and any subsequent PRGs is inverted (e.g., subcarriers associated with a first set of DMRS ports in a first PRG may be associated with a second set of DMRS ports different from the first set of DMRS ports in a second PRG). The configuration may be extended to PRGs supporting up to six ports (e.g., subcarriers associated with a first set of DMRS ports in a first PRG may be associated with a third set of DMRS ports different from both the first set of DMRS ports and the second set of DMRS ports in the second PRG).

Aspects of the disclosure are initially described in the context of wireless communications systems. Aspects of the disclosure are additionally illustrated with reference to PRG diagrams and process flows. Aspects of the disclosure are further illustrated by and described with reference to apparatus diagrams, system diagrams, and flowcharts that relate to reference signal formation for PRGs.

FIG. 1 shows an example of a wireless communications system 100 that supports reference signal formation for PRGs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reference signal formation for PRGs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $TS=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, a UE 115 may receive control signaling (e.g., a DCI) from a network entity 105 indicating a frequency allocation for one or more reference signals (e.g., DMRS) to be transmitted during a PRG. The frequency allocation may configure or indicate one or more subcarriers of the PRG for DMRS signaling (e.g., the frequency allocation may indicate which subcarriers of a given PRG are allocated for a DMRS signal). The UE 115 may receive DMRS for performing a channel estimation procedure based on the frequency allocation. The DMRS may be Type 1 (e.g., supports up to four DMRS ports) or Type 2 (e.g., supports up to six DMRS ports). The DMRS may be transmitted on the multiple subcarriers of the PRG. In some examples, the PRG may be configured to include a DMRS on a first subcarrier of the PRG, a DMRS on a last subcarrier of the PRG, and first pair of DMRS separated by a single subcarrier. The PRG may include a second pair of DMRS separated by two subcarriers or a second pair of DMRS in the PRG to be received on adjacent subcarriers to avoid channel estimation extrapolation. In some other examples, the PRG may be configured to include an additional DMRS at an edge subcarrier to avoid channel estimation extrapolation. Based on receiving the DMRS from the network entity 105, the UE 115 may perform the channel estimation procedure using the received DMRS.

Figure 2:
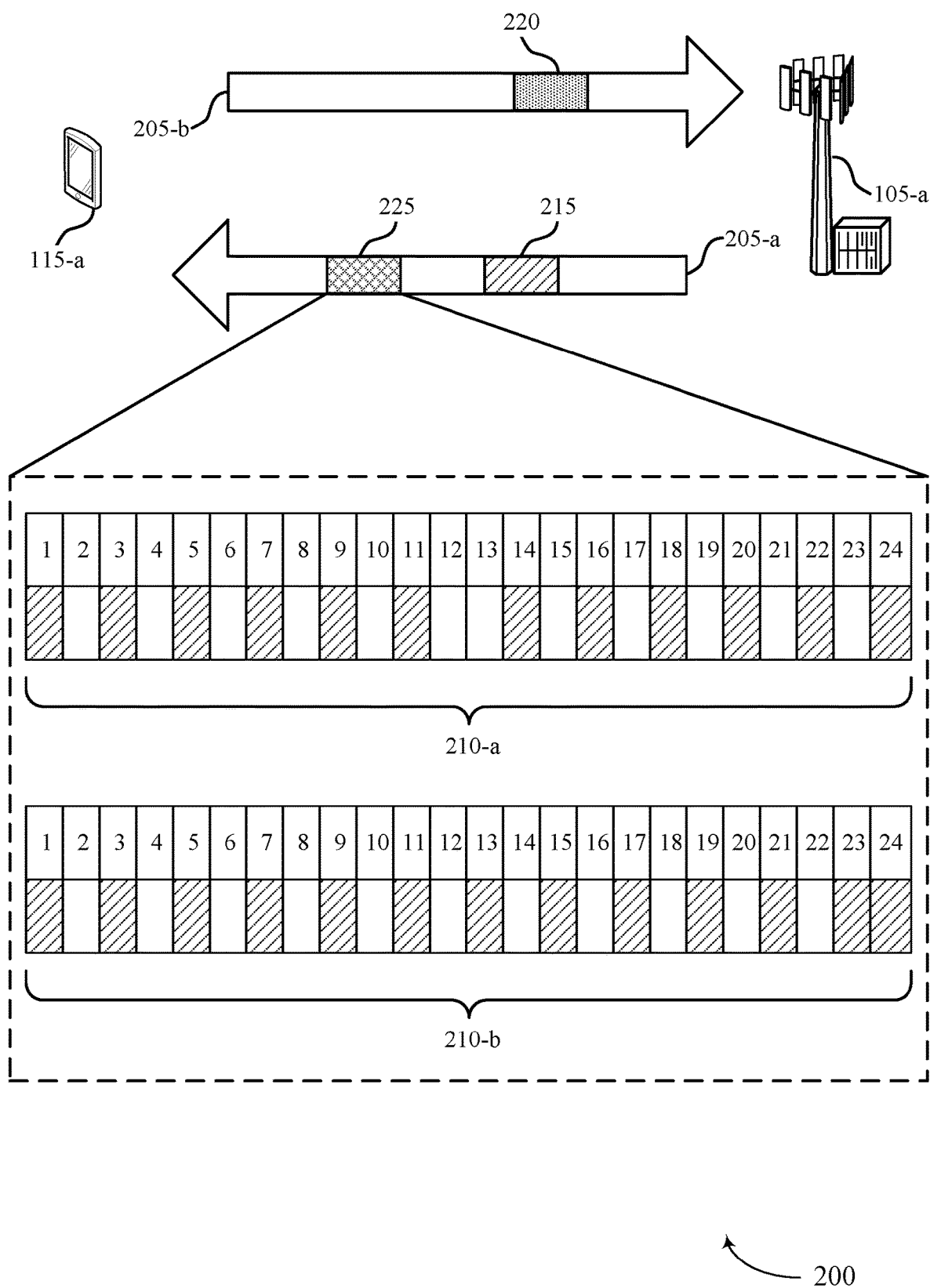
FIG. 2 shows an example of a wireless communications system that supports reference signal formation for PRGs in accordance with one or more aspects of the present disclosure.

FIG. 2 shows an example of a wireless communications system 200 that supports reference signal formation for PRGs in accordance with one or more aspects of the present disclosure. The wireless communications system may include a UE 115-a and a network entity 105-a, which may be examples of corresponding devices described herein, including with respect to FIG. 1. The UE 115-a may communicate with the network entity 105-a via cellular communication links 205 (e.g., a Uu link), including uplink 205-a and downlink 205-b. The UE 115-a and the network entity 105-a may support communications via a frequency bandwidth that exceeds a threshold bandwidth (e.g., UWB, sub-THz) or supports high SNR waveforms (e.g., super-QAM).

To improve data throughput in the frequency bandwidth, the UE 115-a or the network entity 105-a or both may implement frequency selective precoding. As part of the precoding process, the frequency bandwidth may be partitioned into one or more PRGs 210. For example, the frequency bandwidth may be partitioned into one or more first PRGs 210-a or one or more second PRGs 210-b. The one or more PRGs 210 may each span multiple subcarriers. For example, the first PRG 210-a and the second PRG 210-b may each span or include 24 subcarriers. In some examples, the size of the PRG 210 may be below a threshold size (e.g., a threshold quantity of resource blocks, a threshold quantity of subcarriers, or any combination thereof).

As part of a frequency selective precoding procedure, the UE 115-a may perform channel estimation using one or more reference signals 215 allocated to the one or more PRGs 210. In some cases, the UE 115-a may perform channel estimation based on interpolating measurements between multiple reference signals 215 within a PRG 210. In some other cases, the UE 115-a may perform channel estimation based on extrapolating the channel at a final subcarrier (e.g., subcarrier 24) of the first PRG 210-a based on the reference signal 215 received in a prior subcarrier (e.g., subcarrier 23) of the second PRG 210-b. In such cases, the channel estimation quality associated with the PRG 210 may be poor due to such extrapolation. In some examples, the UE 115-a may perform channel estimation using one or more demodulation reference signals (DMRS), which may be Type 1 DMRS (e.g., supports up to four DMRS ports per DMRS symbol) or Type 2 DMRS (e.g., supports up to six DMRS ports per DMRS symbol). In such examples, the one or more PRGs 210 may be single layer or multi-layer based on the DMRS type. For example, the first PRG 210-a and the second PRG 210-b may be single layer.

The reference signals 215 may be allocated to the one or more subcarriers of the one or more PRGs 210. In some examples, the UE 115-a may transmit, to the network entity 105-a, an indication of a capability of the UE 115-a to support a positioning scheme for performing the channel estimation procedure. For example, the UE 115-a may transmit a capability message 220 to the network entity 105-a. The capability message 220 may indicate a capability of the UE 115-a to receive the one or more reference signals 215 during the one or more PRGs 210 according to a positioning scheme. In some instances, the capability message 220 may indicate one or more of a modified DMRS, a type of DMRS, subcarrier allocation, PRG allocation, or a combination thereof. For example, the UE 115-a may support receiving reference signals 215 according to the first PRG 210-a, may support receiving reference signals 215 according to the second PRG 210-b, or both. The positioning scheme may be based on the size (e.g., a quantity of subcarriers) of the one or more PRGs 210.

Based on receiving the capability message 220, the network entity 105-a may transmit an indication of a frequency allocation 225 to the UE 115-a. For example, the network entity 105-a may indicate the frequency allocation 225 via control signaling (e.g., downlink control information (DCI)). Additionally, or alternatively, the network entity 105-a may indicate the frequency allocation 225 via RRC signaling. The frequency allocation 225 may configure the one or more PRGs 210 with a subcarrier allocation, a quantity of reference signals 215, or both. The network entity 105-a may further indicate a reference signal configuration to the UE 115-a via control signaling. The reference signal configuration may include a modified reference signal, a type of reference signal, a PRG allocation, or any combination thereof.

In some examples, the frequency allocation 225 may configure the edge subcarriers (e.g., a first subcarrier and a last subcarrier) of the one or more PRGs 210 with a respective reference signal 215. For example, the frequency allocation 225 may configure both subcarrier 1 and subcarrier 24 of the first PRG 210-a or the second PRG 210-b with a respective reference signal 215. The one or more PRGs 210 may be configured according to the frequency allocation 225 until an end of the frequency allocation 225.

The frequency allocation 225 may further include a configuration for the internal subcarriers (e.g., subcarriers 2-23) of the one or more PRGs 210 with a remaining quantity of reference signals 215. In some cases, the frequency allocation 225 may include a configuration for or otherwise configure the remaining reference signals 215 across evenly spaced subcarriers of the first PRG 210-a relative to the edge subcarriers (e.g., the first subcarrier and the last subcarrier) of the first PRG 210-a. For example, the frequency allocation 225 may configure reference signals 215 to subcarriers 3-11 and subcarriers 14-22 of the first PRG 210-a, which may each be separated by one subcarrier of the first PRG 210-a. In such cases, the second pair of reference signals 215 may be separated by two subcarriers of the first PRG 210-*a*. For example, the reference signals 215 received in subcarrier 11 and subcarrier 14 may be separated by subcarrier 12 and subcarrier 13 of the first PRG 210-*a*. In some other cases, the frequency allocation 225 may include a configuration for or otherwise configure the one or more PRGs 210 with an additional reference signal 215. For example, in the case of the second PRG 210-*b*, the frequency allocation 225 may configure the second PRG 210-*b* with reference signals 215 in alternating subcarriers (e.g., every odd subcarrier). In such other cases, the second pair of reference signals 215 may be received via adjacent subcarriers (e.g., may not be separated by a subcarrier) of the second PRG 210-*b*. For example, in the case of the second PRG 210-*b*, the reference signals received in subcarrier 23 and subcarrier 24 are adjacent. Based on receiving the frequency allocation 225 from the network entity 105-*a*, the UE 115-*a* may receive and process the reference signals 215.

Figure 3:
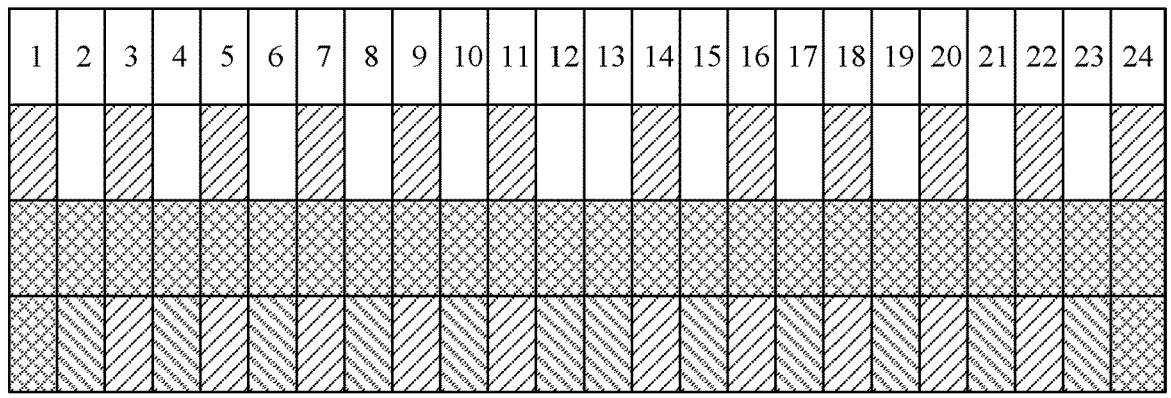
FIG. 3 shows an example of a PRG diagram that supports reference signal formation for PRGs in accordance with one or more aspects of the present disclosure.
Figure 3:
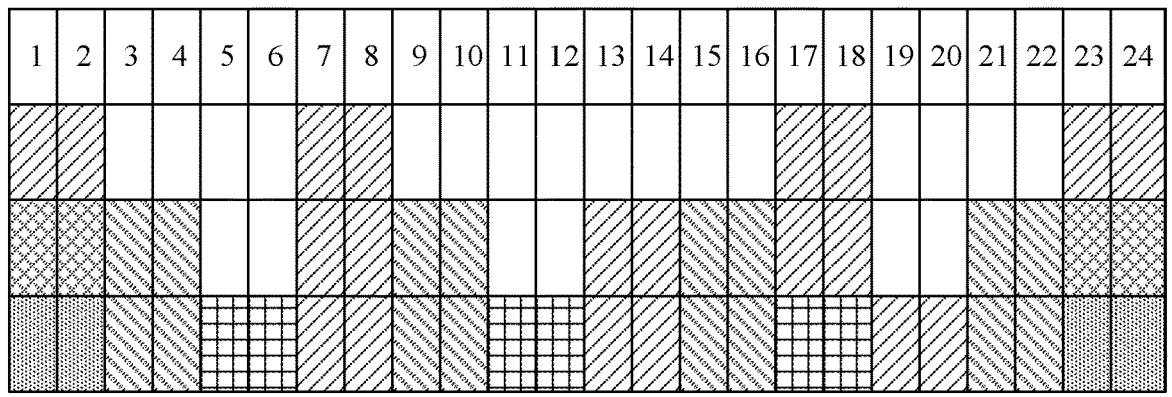
Figure 3:
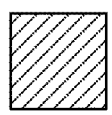
Figure 3:
Figure 3:
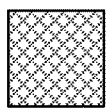
Figure 3:
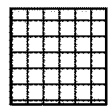
Figure 3:
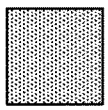

FIG. 3 shows an example of a PRG diagram 300 that supports reference signal formation for PRGs in accordance with one or more aspects of the present disclosure. The PRG diagram 300 may be implemented by aspects of the wireless communications system 100 and the wireless communications system 200 as described with reference to FIGS. 1 and 2. For instance, in the example of FIG. 3, a UE 115 and a network entity 105 may perform communications in accordance with a PRG 305, which may be examples of corresponding devices and configurations described herein, including with reference to FIGS. 1 and 2. For example, the PRG 305 may span or include multiple subcarriers (ascending horizontally across the PRG 305) and may be further configured with reference signals (e.g., DMRS) associated with the multiple subcarriers. The PRG 305 may further include multiple layers (ascending vertically across the PRG 305), which may correspond to different port relationships associated with the PRG 305.

In some examples, the PRG 305 may include one or more DMRS. In such examples, the PRG 305 may be multi-layer based on the DMRS supporting multiple orthogonal ports. The multiple orthogonal DMRS ports may be associated (e.g., linked) using an orthogonal cover code (OCC). In some cases where the DMRS is a Type 1 DMRS, the PRG 305 may be a first PRG 305-*a*. In such cases, the first PRG 305-*a* may support up to 4 orthogonal DMRS ports. The multiple orthogonal DMRS ports may be associated (e.g., linked) using a OCC. For example, a symbol port 1/2 OCC 310 within a subcarrier may indicate a mapping between port 1 and port 2 of the DMRS. Likewise, a symbol port 3/4 OCC 315 may indicate a mapping between port 3 and port 4 of the DMRS, and ports 1-4 OCC 320 may indicate a mapping between ports 1 through 4 of the DMRS. In some other cases where the DMRS is a Type 2 DMRS, the PRG 305 may be a second PRG 305-*b*. In such other cases, the second PRG 305-*b* may support up to 6 orthogonal DMRS ports. In addition to the codes discussed with reference to a four port DMRS, a symbol port 5/6 OCC 325 may indicate a mapping between port 5 and port 6 of the DMRS, and a symbol port 1-6 OCC 330 may indicate a mapping between ports 1 through 6 of the DMRS.

In some examples where the DMRS supports up to two orthogonal DMRS ports, the PRG 305 may be a single-layer PRG as described with reference to the first PRG 210-*a* of FIG. 2. In such examples, the PRG 305 may be configured with one or more Port 1/2 OCCs 310 during one or more respective subcarriers of the PRG 305 indicating that the DMRS received during the subcarrier may be associated with two DMRS ports. In some cases, the one or more Port 1/2 OCCs 310 may be allocated to the subcarriers of the PRG 305 according to a frequency allocation associated with single port DMRS, including with reference to FIG. 2. For example, the edge subcarriers (e.g., the first subcarrier, the last subcarrier) of the PRG 305 may include a Port 1/2 OCC 310. In such cases, applying a single port frequency allocation to a dual port DMRS may result in one additional subcarrier extrapolation for each port compared to applying the single port frequency allocation to a single port DMRS.

In some examples where the DMRS supports up to four orthogonal DMRS ports (e.g., is a Type 1 DMRS), the PRG 305 may be a first PRG 305-*a*, which may be multi-layered. In such examples, all subcarriers of the PRG may include a Port 1/2 OCC 310, a Port 3/4 OCC 315, or a Port 1-4 OCC 320. In some cases, each orthogonal DMRS port may be weighted equally (e.g., ports are symmetrical). In such cases, each subcarrier of the first PRG 305-*a* may include a Port 1-4 OCC 320. In some examples, each resource element may include a code composed of the n ports of the relevant constellation (codes are orthogonal) with same weight for each port. That is, each port may have a same weight. In such cases, when performing channel estimation on the first PRG 305-*a*, the UE may perform an effective interpolation of 2 subcarriers for a three-port constellation (e.g., DMRS includes up to three linked ports) and may perform an effective interpolation of 2.5 subcarriers for a four-port constellation.

In some other cases, each port may be weighted separately (e.g., ports are not symmetrical). When the scenario is not symmetrical, different code formation can be selected. For example, for 4 ports, if the UE 115 is configured to give preference to specific ports, the UE can select the first and last resource elements of the PRG (or at the end of each 3 or 4 REs) to include a combination of the entire set (e.g., $\Sigma_{k=0}^{np-1}(-1)^k P_k, \Sigma_{p=0}^{np-1} P_k$). In some examples, the middle ones may include single ports or double separated with OCC code. In such cases, a different code formation may be selected. For example, the edge subcarriers (e.g., a first subcarrier and a last subcarrier) of the first PRG 305-*a* may include a Port 1-4 OCC 320, and the internal subcarriers may contain single ports or double ports linked using Port 1/2 OCC 310 or Port 3/4 OCC 315.

In some examples where the DMRS supports up to six orthogonal DMRS ports (e.g., is a Type 2 DMRS), the PRG 305 may be a second PRG 305-*b*, which may be multi-layered. In such examples, the DMRS may be received in multiple resource elements of the second PRG 305-*b*. For example, the UE 115 may receive a first DMRS via subcarrier 1 and subcarrier 2 of the second PRG 305-*b* and a second DMRS via subcarrier 23 and subcarrier 24 of the second PRG 305-*b*. Further, additional codes may be introduced to link additional ports, including Port 5/6 OCC 325 and Port 1-6 OCC 330. In accordance with examples described herein, the edge subcarriers (e.g., a first two subcarriers and a last two subcarriers) of the second PRG 305-*b* may include a Port 1-6 OCC 330, and the internal subcarriers may include single ports or double ports linked using Port 1/2 OCC 310, Port 3/4 OCC 315, or Port 5/6 OCC 325.

Figure 4:
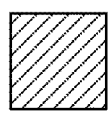
FIG. 4 shows an example of a PRG diagram that supports reference signal formation for PRGs in accordance with one or more aspects of the present disclosure.
Figure 4:
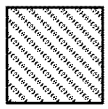
Figure 4:
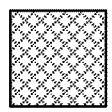
Figure 4:
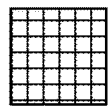
Figure 4:
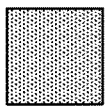

FIG. 4 shows an example of a PRG diagram 400 that supports reference signal formation for PRGs in accordance with one or more aspects of the present disclosure. The PRG diagram 400 may be implemented by aspects of the wireless communications system 100 and the wireless communications system 200 as described with reference to FIGS. 1 and 2. For instance, in the example of FIG. 4, a UE 115 and a network entity 105 may perform communications according to a PRG 405, which may be examples of corresponding devices and configurations described herein, including with reference to FIGS. 1 and 2. For example, the PRG 405 may span or include multiple subcarriers (ascending horizontally across the PRG 405) and may be further configured with reference signals (e.g., DMRS) associated with the multiple subcarriers. The PRG 405 may further include multiple layers (ascending vertically across the PRG 405), which may correspond to different port relationships associated with the PRG 405.

In some examples, the PRG 405 may be configured with one or more DMRS. In such examples, the PRG 405 may be multi-layer based on the DMRS supporting multiple orthogonal ports. In some cases where the DMRS is a Type 1 DMRS, the PRG 405 may be a first PRG 405-a, which may be an example of a Type 1 DMRS as described with reference to FIG. 3. For example, a symbol port 1/2 OCC 410 within a subcarrier may indicate a mapping between port 1 and port 2 of the DMRS. Likewise, a symbol port 3/4 OCC 415 may indicate a mapping between port 3 and port 4 of the DMRS, and ports 1-4 OCC 420 may indicate a mapping between ports 1 through 4 of the DMRS. In some other cases where the DMRS is a Type 2 DMRS, the PRG 405 may be a second PRG 405-b, which may be an example of a Type 2 DMRS as described with reference to FIG. 3. In such other cases, the second PRG 405-b may support up to 6 orthogonal DMRS ports. In addition to the codes discussed with reference to a four port DMRS, a symbol port 5/6 OCC 425 may indicate a mapping between port 5 and port 6 of the DMRS, and a symbol port 1-6 OCC 430 may indicate a mapping between ports 1 through 6 of the DMRS. In some examples, the PRG 405 may include or be configured with an additional DMRS (e.g., code) at a last subcarrier of the PRG 405.

In some examples where the DMRS supports up to two orthogonal DMRS ports (e.g., channels), the PRG 405 may be a single-layer PRG as described with reference to the second PRG 210-b of FIG. 2. In such examples, the PRG 405 may be configured with one or more Port 1/2 OCCs 410 during one or more respective subcarriers of the PRG 405 indicating that the DMRS received during the subcarrier may be associated with two DMRS ports. In some cases, the one or more port 1/2 OCCs 410 may be allocated to the subcarriers of the PRG 405 according to a frequency allocation associated with single port DMRS, including with reference to FIG. 2. For example, the edge subcarriers (e.g., the first subcarrier and the last subcarrier) of the PRG 405 may include a port 1/2 OCC 410. In such cases, allocating the port 1/2 OCC 410 during the edge subcarrier of the PRG 405 may assist the UE in performing a channel estimation procedure on the PRG 405 by avoiding extrapolation at an edge subcarrier.

In some examples where the DMRS supports up to four DMRS ports, the PRG 405 may be a first PRG 405-a, which may be multi-layered. For 3 and above channels, the odd and even subcarriers may include OCC code of pair of ports (or one for 3 transmit ports). The side subcarriers may include the relevant OCC code of the ports which are not originally contained within them (the technique increases a bit the effective interpolation distance of the original ports and decrease that of the added one/s). In such examples, all subcarriers of the first PRG 405-a may include a port 1/2 OCC 410, a port 3/4 OCC 415, or a port 1-4 OCC 420. For example, one or more port 1/2 OCCs 410 may be allocated to one or more alternating internal subcarriers of the first PRG 405-a according to a frequency allocation associated with single port DMRS, including with reference to the second PRG 210-b of FIG. 2. One or more port 3/4 OCCs 415 may be allocated to the remaining alternating internal subcarriers of the first PRG 405-a. For example, port 1/2 OCCs 410 may be associated with odd subcarriers of the first PRG 405-a, and port 3/4 OCCs 415 may be associated with even subcarriers of the first PRG 405-a. Further, the first PRG 405-a may include a port 1-4 OCC 420 in the edge subcarriers (e.g., subcarrier 1 and subcarrier 24) of the first PRG 405-a. In such examples, the effective interpolation distance (e.g., between DMRS) between the original ports (e.g., port 1 and port 2) may increase, but the effective interpolation distance between the new ports (e.g., port 3 and port 4) may decrease.

In some examples where the DMRS supports up to six orthogonal DMRS ports (e.g., is a Type 2 DMRS), the PRG 405 may be a second PRG 405-b, which may be multi-layered. In such examples, the DMRS may be received in multiple resource elements of the second PRG 405-b. For example, the UE may receive a first DMRS in subcarrier 1 and subcarrier 2 of the second PRG 405-b and a second DMRS in subcarrier 23 and subcarrier 24 of the second PRG 405-b. Further in such examples, additional codes may be introduced to link additional ports, including port 5/6 OCC 425 and port 1-6 OCC 430. In accordance with examples described herein, the second PRG 405-b may be configured with a code at a last two subcarriers of the second PRG 405-b. In such cases, the code within the last two subcarriers may include a sum of all ports. Further, sum boosting should be applied to the sums (e.g., port 1-4 OCC 420, port 1-6 OCC 430). For example, the last two subcarriers (e.g., subcarrier 23 and subcarrier 24) of the second PRG 405-b may each include a port 1-6 OCC 430, and adjacent pairs of internal subcarriers may include single ports or double ports linked using port 1/2 OCCs 410, port 3/4 OCCs 415, or port 5/6 OCCs 425.

Figure 5:
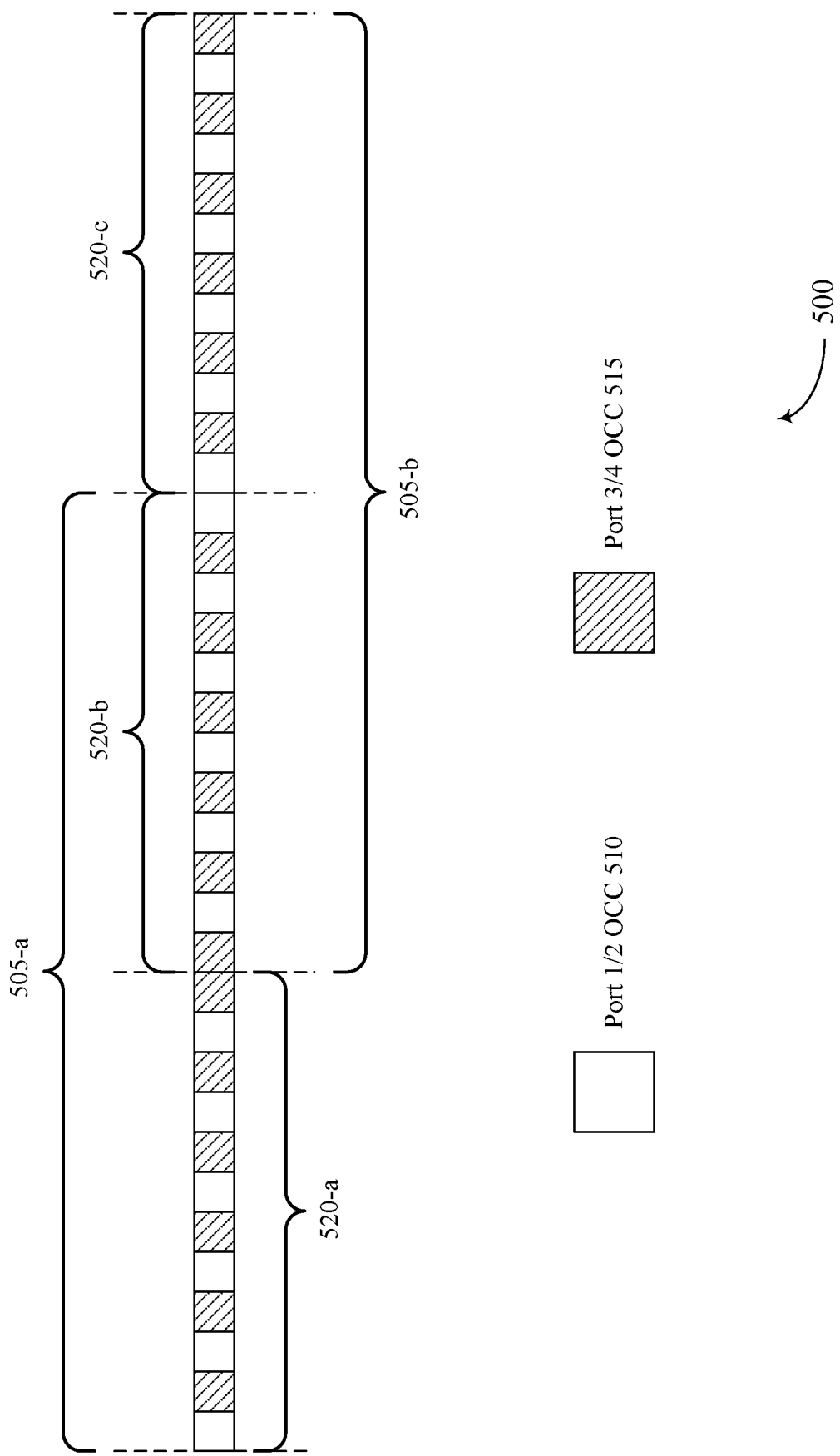
FIG. 5 shows an example of a PRG diagram that supports reference signal formation for PRGs in accordance with one or more aspects of the present disclosure.

FIG. 5 shows an example of a PRG diagram 500 that supports reference signal formation for PRGs in accordance with one or more aspects of the present disclosure. The PRG diagram 500 may be implemented by aspects of the wireless communications system 100 and the wireless communications system 200 as described with reference to FIGS. 1 and 2. For instance, in the example of FIG. 5, a UE 115 and a network entity 105 may perform communications according to a first PRG 505-a and a second PRG 505-b, which may be examples of corresponding devices and configurations described herein, including with reference to FIGS. 1 and 2. For example, the PRG 505 may span or include multiple subcarriers (ascending horizontally across the PRG 505) and may be further configured with reference signals (e.g., DMRS) associated with the multiple subcarriers. The PRG 505 may further include multiple layers (ascending vertically across the PRG 505), which may correspond to different port relationships associated with the PRG 505.

For 2 to 4 layers (e.g., ports 1000 to 1003), the techniques depicted herein provide for changing the boundaries of the PRG per port and switching the positioning of the ports between even and odd PRGs, as follows: x-port 1000, 1001, and o-port 1002, 1003. The PRGs 505 may support multiple ports and may indicate that two ports are associated (e.g., co-located) based on a code (e.g., OCC). For example, the first PRG 505-a may be associated with a first port (e.g., port 1) and a second port (e.g., port 2) using port 1/2 OCCs 510, and the second PRG 505-b may be associated with a third port (e.g., port 3) and a fourth port (e.g., port 4) using port 3/4 OCCs 515.

For 2 to 4 ports (e.g., ports 1000 to 1003), the techniques depicted herein provide for changing the boundaries of the PRG per port and switching the positioning of the ports between even and odd PRGs, as follows: x-port 1000, 1001, and o-port 1002, 1003. In some examples where the PRGs 505 may support multiple layers (e.g., multiple ports), the UE 115 or the network entity 105 may modify a port allocation 520, which may include a first port allocation 520-a, a second port allocation 520-b, and a third port allocation 520-c. The first PRG 505-a may be associated with the first port allocation 520-a and the second port allocation 520-b, and the second PRG 505-b may be associated with the second port allocation 520-b and the third port allocation 520-c. In some cases, the UE or the network entity may change the second port allocation 520-b that is associated with both the first PRG 505-a and the second PRG 505-b. The UE 115 or the network entity 105 may invert the positions of the port 1/2 OCCs 510 and the port 3/4 OCCs 515 within the second port allocation 520-b. In such cases, the edge subcarriers (e.g., the first subcarrier and the last subcarrier) of the first PRG 505-a may be the same code (e.g., a Port 1/2 OCC 510), and the edge subcarriers of the second PRG 505-b may be the same code (e.g., a Port 3/4 OCC 515). In such cases, the UE 115 or the network entity 105 may modify the edge subcarriers of a PRG 505 without allocating additional ports to the edge subcarriers of the PRG 505.

Figure 6:
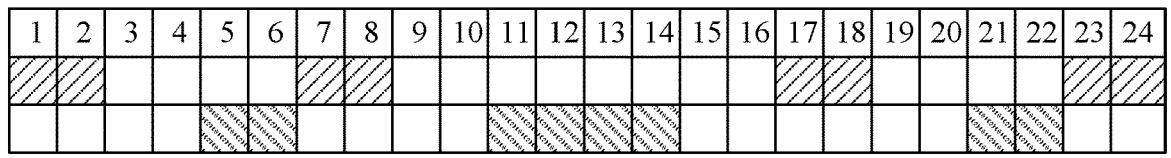
FIG. 6 shows an example of a PRG diagram that supports reference signal formation for PRGs in accordance with one or more aspects of the present disclosure.
Figure 6:
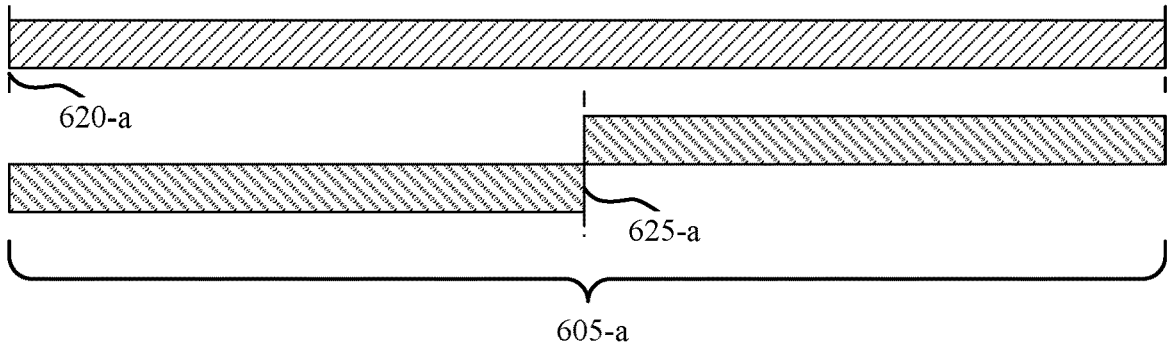
Figure 6:
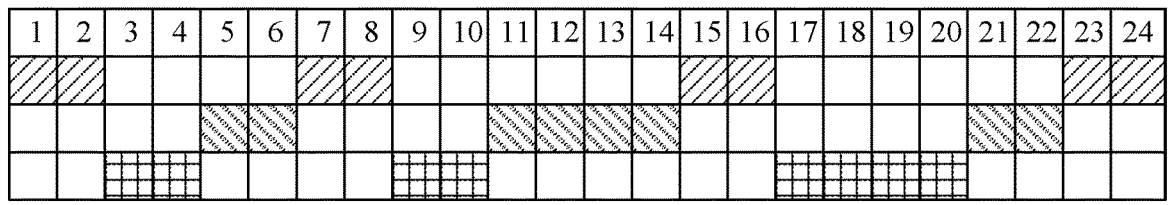
Figure 6:
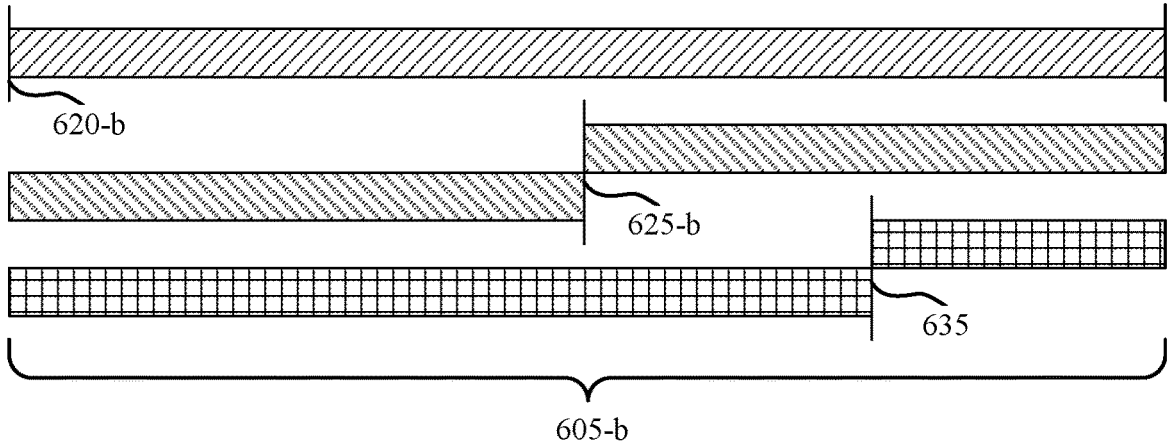
Figure 6:
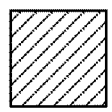
Figure 6:
Figure 6:
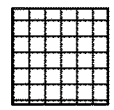

FIG. 6 shows an example of a PRG diagram 600 that supports reference signal formation for PRGs in accordance with one or more aspects of the present disclosure. The PRG diagram 600 may be implemented by aspects of the wireless communications system 100 and the wireless communications system 200 as described with reference to FIGS. 1 and 2. For instance, in the example of FIG. 6, a UE 115 and a network entity 105 may perform communications according to a PRG 605, which may be examples of corresponding devices and configurations described herein, including with reference to FIGS. 1 and 2. For example, the PRG 605 may span or include multiple subcarriers, and may be further configured with reference signals (e.g., DMRS) associated with the multiple subcarriers (ascending horizontally across the PRG 605). The DMRS may be Type 2 DMRS, and the PRG 605 may include DMRS received across multiple subcarriers of the PRG 605, as described with reference to FIG. 3. The PRG 605 may further include multiple layers (ascending vertically across the PRG 605), which may correspond to different port relationships associated with the PRG 605. The PRG 605 may also support multiple ports. For example, a first PRG 605-a may support between two and four ports, and a second PRG 605-b may support up to six ports.

In some examples where the DMRS supports between two and four ports, the PRG 605 may be the first PRG 605-a. In such cases, two associated (e.g., co-located) ports may be separated by code (e.g., OCC). For example, the first PRG 605-a may be associated with a first port (e.g., port 1) and a second port (e.g., port 2) using port 1/2 OCCs 610, as well as a third port (e.g., port 3) and a fourth port (e.g., port 4) using port 3/4 OCCs 615. The UE 115 or the network entity 105 may modify boundaries associated with the first PRG 605-a as described with reference to FIG. 5. For example, based on a frequency allocation received from the network entity 105, the UE 115 may adjust the position (e.g., subcarrier allocation) of port 1/2 OCCs 610, port 3/4 OCCs 615, or any combination thereof, within the first PRG 605-a. Based on adjusting the position of the OCCs, the UE or the network entity may further modify a start point and an end point of a PRG 605 associated with port 1/2 OCCs 610, port 3/4 OCCs 615, or both. For example, the PRG 605 associated with the first port and the second port (e.g., the PRG 605 associated with port 1/2 OCCs 610) may begin at a period 620-a. The PRG 605 associated with the third port and the fourth port (e.g., the PRG 605 associated with Port 3/4 OCCs 615) may begin at a period 625-a, which may be offset from the period 620-a. The period 625-a may occur during (e.g., in the middle of) the first PRG 605-a. In some implementations, additional ports may be introduced to the first PRG 605-a by introducing additional OCC symbols.

In some other examples where the DMRS supports up to 6 ports, the PRG 605 may be the second PRG 605-b. In such cases, two associated (e.g., co-located) ports may be separated by OCC. For example, the second PRG 605-b may be associated with a first port (e.g., port 1) and a second port (e.g., port 2) using port 1/2 OCCs 610, a third port (e.g., port 3) and a fourth port (e.g., port 4) using port 3/4 OCCs 615, and a fifth port (e.g., port 5) and a sixth port (e.g., port 6) using port 5/6 OCCs 630. The UE 115 or the network entity 105 may modify boundaries associated with the second PRG 605-b as described with reference to FIG. 5. For example, based on a frequency allocation received from the network entity, the UE may adjust the position (e.g., subcarrier allocation) of port 1/2 OCCs 610, port 3/4 OCCs 615, port 5/6 OCCs 630, or any combination thereof, within the second PRG 605-b. Based on adjusting the position of the OCCs, the UE 115 or the network entity 105 may further modify a start point and an end point of a PRG 605 associated with port 1/2 OCCs 610, port 3/4 OCCs 615, port 5/6 OCCs 630, or any combination thereof. For example, the PRG 605 associated with the first port and the second port (e.g., the PRG 605 associated with Port 1/2 OCCs 610) may begin at a period 620-b. The PRG 605 associated with the third port and the fourth port (e.g., the PRG 605 associated with Port 3/4 OCCs 615) may begin at a period 625-b, which may be at an offset from the period 620-b. The PRG 605 associated with the fifth port and the sixth port (e.g., the PRG 605 associated with Port 5/6 OCCs 630) may begin at a period 635, which may be offset from the period 620-b and the period 625-b. The period 625-b, the period 635, or both may occur during (e.g., in the middle of) the second PRG 605-b. In some implementations, the OCCs may be transmitted in four subcarriers. In such implementations, a full frame of the PRG 605 may be determined. Further, the period associated with the PRG 605 may occur at a multiple of a full resource block.

Further, in some implementations, the network entity 105 may transmit an indication of modified DMRS to the UE 115. In some examples, the DMRS may be mapped to physical resources according to a relationship based on the DMRS type. In some cases where the DMRS type is Type 1, the network entity 105 may modify the DMRS according to Equation 1 and Table 1 below:

$$k = k'' + (-1)^\Delta \mod \left( \left\lfloor \frac{k''}{\frac{PRG}{2}} \right\rfloor, 2 \right) \quad (1)$$

TABLE 1

| CDM Group λ | $\Delta_1$ |
| --- | --- |
| 0 | 0 |
| 1 | 4 |

In some other cases where the DMRS type is Type 2, the network entity 105 may modify the DMRS according to Equation 2 and Table 2 below:

$$k = k'' + \Delta_1 \mathrm{mod}\left(\left\lfloor\frac{k''}{\frac{PRG}{2}}\right\rfloor + 1, 2\right) + \Delta_2 \mathrm{mod}\left(\left\lfloor\frac{k''}{\frac{PRG}{2}}\right\rfloor, 2\right) \quad (2)$$

TABLE 2

| CDM Group λ | $\Delta_1$ | $\Delta_2$ |
|---|---|---|
| 0 | 0 | 4 |
| 1 | 4 | $2\mathrm{mod}\left(\left\lfloor\frac{k''}{\frac{PRG}{4}}\right\rfloor, 2\right)$ |
| 2 | 2 | $2\mathrm{mod}\left(\left\lfloor\frac{k''}{\frac{PRG}{4}}\right\rfloor + 1, 2\right)$ |

The network entity may further determine the modified DMRS according to Equation 3 below.

$$k'' = f(x) = \begin{cases} 4n + 2k' + \Delta, & \text{configuration type 1} \\ 6n + 2k', & \text{configuration type 2} \end{cases} \quad (3)$$

$$k' = 0, 1 \; l = \bar{l} + l'  n = 0, 1, .$$

The network entity 105 may include the modified DMRS in a reference signal configuration.

Figure 7:
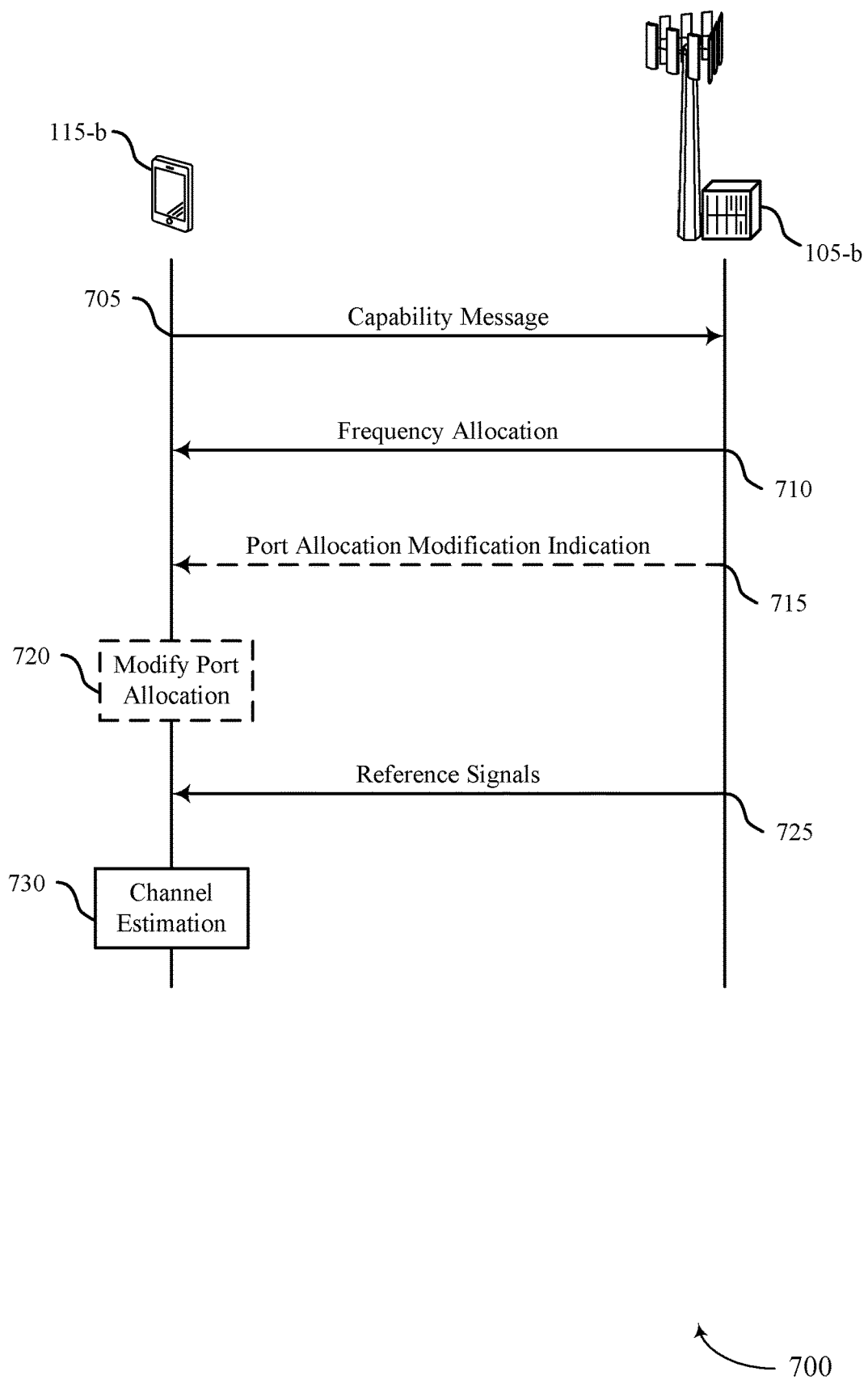
FIG. 7 shows an example of a process flow that supports reference signal formation for PRGs in accordance with one or more aspects of the present disclosure.

FIG. 7 shows an example of a process flow 700 that supports reference signal formation for PRGs in accordance with one or more aspects of the present disclosure. The process flow 700 may implement or be implemented by aspects of the wireless communications system 100 and the wireless communications system 200 as described with reference to FIG. 1. For instance, in the example of FIG. 7, a UE 115-b may be in communication with a network entity 105-b. The UE 115-b may be an example of a UE 115, and the network entity 105-b may be an example of a network entity 105 as described with reference to FIG. 1. The UE 115-b may communicate with the network entity 105-b via a cellular communication link which may be an example of a communication link 125 with respect to FIG. 1. In the following description of the process flow 700, the operations between the UE 115-b and the network entity 105-b may be transmitted in a different order than the example order shown, or the operations between the UE 115-b and the network entity 105-b may be performed in different orders at different times. Some operations may also be omitted from the process flow 700, and other operations may be added to the process flow 700.

At 705, the UE 115-b may transmit a capability message indicating a capability of the UE 115-b to support a positioning scheme for one or more reference signals within a PRG for a channel estimation procedure. In some cases, the positioning scheme is based on a resource partition size for a PRG associated with the channel estimation procedure. The one or more reference signals may include one or more uplink reference signals, DMRS, or any combination thereof.

At 710, the UE 115-b may receive, based on the capability message, a control signal indicating a frequency allocation for the one or more reference signals for the channel estimation procedure, the frequency allocation for the one or more reference signals being based on the positioning scheme supported by the UE 115-b. The control signaling may further include an indication of a reference signal configuration including at least one of a modified reference signal, a type of reference signal, a PRG allocation, or any combination thereof.

At 715, the UE 115-b may receive an indication to modify one or more port allocations of the PRG. At 720, the UE 115-b may perform a modification of the one or more port allocations of the PRG based on receiving the indication.

At 725, the UE 115-b may receive the one or more reference signals for the channel estimation procedure in accordance with the frequency allocation. The UE 115-b may receive the one or more reference signals based on performing the modification of the one or more port allocations. In some examples, the UE 115-b may receive a first reference signal via a first subcarrier of the PRG and a second reference signal via a last subcarrier of the PRG. In some cases, a first pair of the one or more reference signals in the PRG may be separated by a single subcarrier and a second pair of the one or more reference signals in the PRG may be separated by two subcarriers. In some other cases, a first pair of the one or more reference signals in the PRG may be separated by a single subcarrier and a second pair of the one or more reference signals in the PRG may be received via adjacent subcarriers of the PRG.

In some examples, the first reference signal and the second reference signal may be associated with an OCC. Further, a first symbol associated with the first reference signal and a second symbol associated with the second reference signal may be mapped to a pair of ports. In some cases, the UE 115-b may receive the one or more reference signals via each subcarrier of the PRG. In some other cases, each resource element of the PRG may include an OCC associated with three or more ports of a constellation. In yet some other cases, the UE 115-b may receive a first reference signal via a first resource element of the PRG and a second reference signal via a last resource element of the PRG. In such other cases, the first resource element and the last resource element may each include OCCs associated with three or more ports and remaining resource elements of the PRG may include OCCs associated with at least a pair of ports. In yet some other examples, the UE 115-b may receive a first reference signal via first two resource elements of the PRG and a second reference signal via last two resource elements of the PRG. In some cases, the first two resource elements and the last two resource elements may each include OCCs associated with up to six ports.

At 730, the UE 115-b may perform the channel estimation procedure using the one or more reference signals based on the PRG associated with the channel estimation procedure. The UE 115-b may perform the channel estimation procedure based on the reference signal configuration received at 710.

Figure 8:
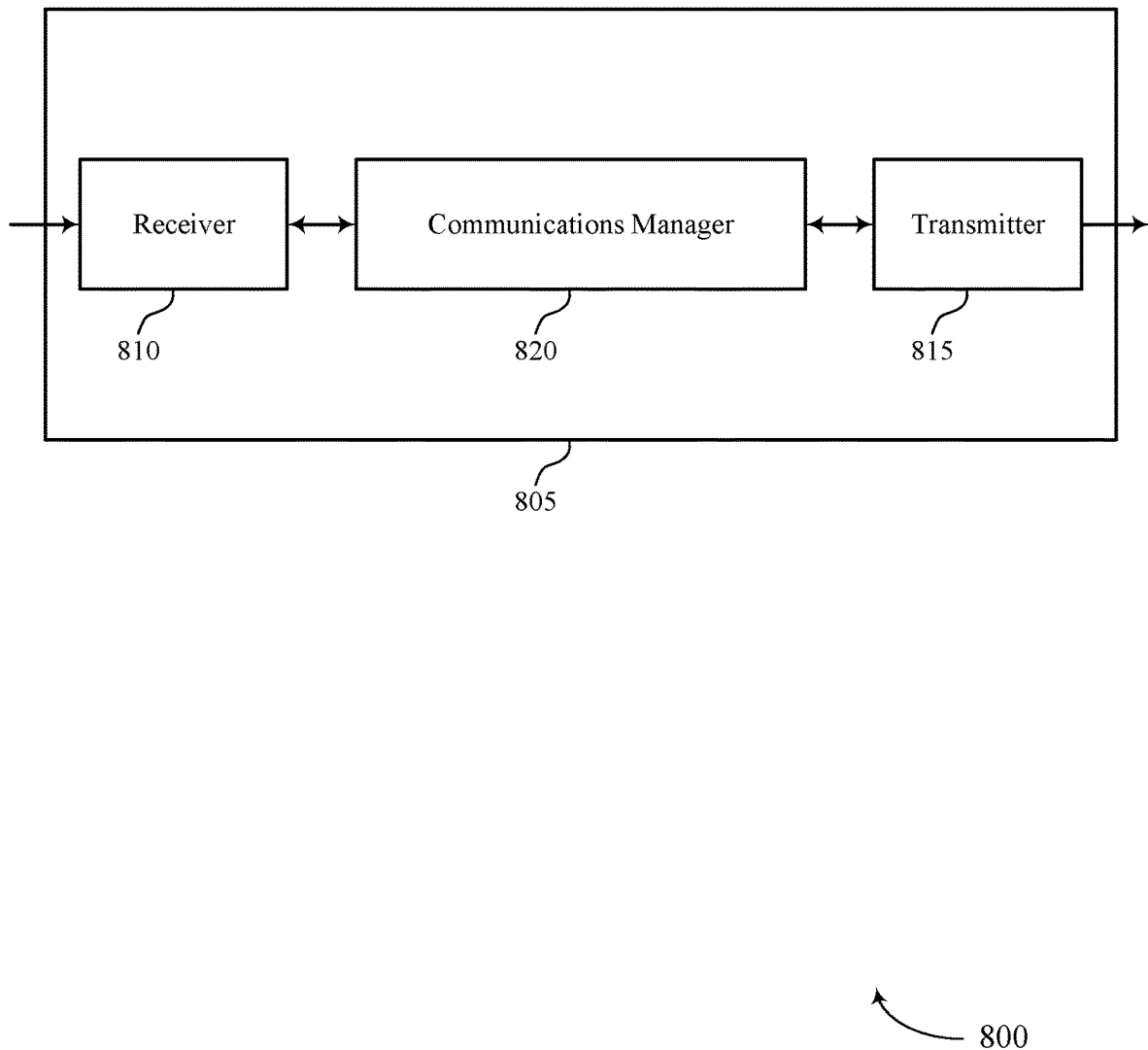
FIGS. 8 and 9 show block diagrams of devices that support reference signal formation for PRGs in accordance with one or more aspects of the present disclosure.

FIG. 8 shows a block diagram 800 of a device 805 that supports reference signal formation for PRGs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reference signal formation for PRGs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reference signal formation for PRGs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reference signal formation for PRGs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry), software (e.g., executed by a processor), or any combination thereof. The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the at least one processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 is capable of, configured to, or operable to support a means for transmitting a capability message indicating a capability of the UE to support a positioning scheme for one or more reference signals within a PRG for a channel estimation procedure. The communications manager 820 is capable of, configured to, or operable to support a means for receiving, based on the capability message, a control signal indicating a frequency allocation for the one or more reference signals for the channel estimation procedure, the frequency allocation for the one or more reference signals being based on the positioning scheme supported by the UE. The communications manager 820 is capable of, configured to, or operable to support a means for receiving the one or more reference signals for the channel estimation procedure in accordance with the frequency allocation. The communications manager 820 is capable of, configured to, or operable to support a means for performing the channel estimation procedure using the one or more reference signals based on the PRG associated with the channel estimation procedure.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for improved channel estimation quality and improved data throughput.

Figure 9:
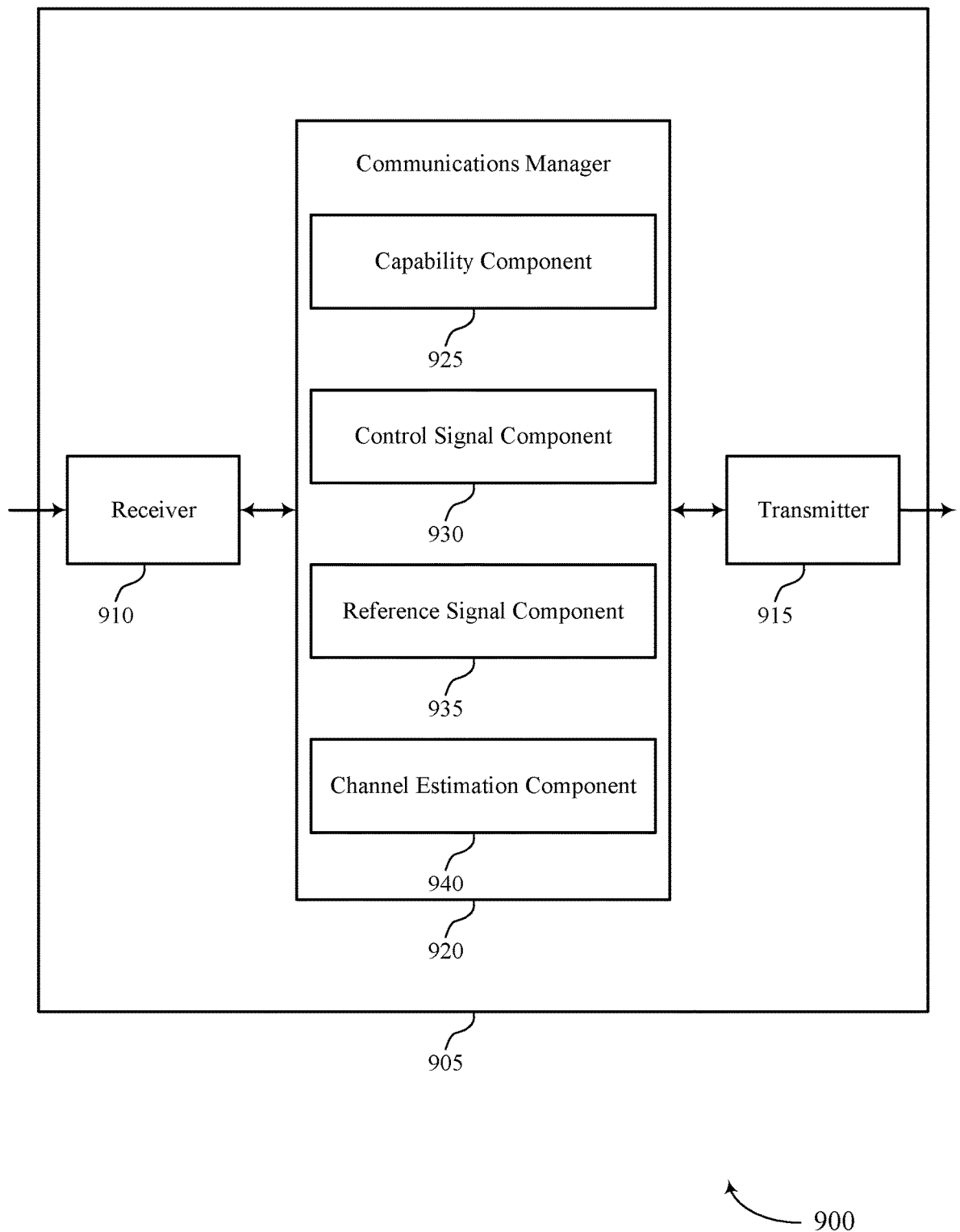

FIG. 9 shows a block diagram 900 of a device 905 that supports reference signal formation for PRGs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal formation for PRGs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal formation for PRGs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reference signal formation for PRGs as described herein. For example, the communications manager 920 may include a capability component 925, a control signal component 930, a reference signal component 935, a channel estimation component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The capability component 925 is capable of, configured to, or operable to support a means for transmitting a capability message indicating a capability of the UE to support a positioning scheme for one or more reference signals within a PRG for a channel estimation procedure. The control signal component 930 is capable of, configured to, or operable to support a means for receiving, based on the capability message, a control signal indicating a frequency allocation for the one or more reference signals for the channel estimation procedure, the frequency allocation for the one or more reference signals being based on the positioning scheme supported by the UE. The reference signal component 935 is capable of, configured to, or operable to support a means for receiving the one or more reference signals for the channel estimation procedure in accordance with the frequency allocation. The channel estimation component 940 is capable of, configured to, or operable to support a means for performing the channel estimation procedure using the one or more reference signals based on the PRG associated with the channel estimation procedure.

Figure 10:
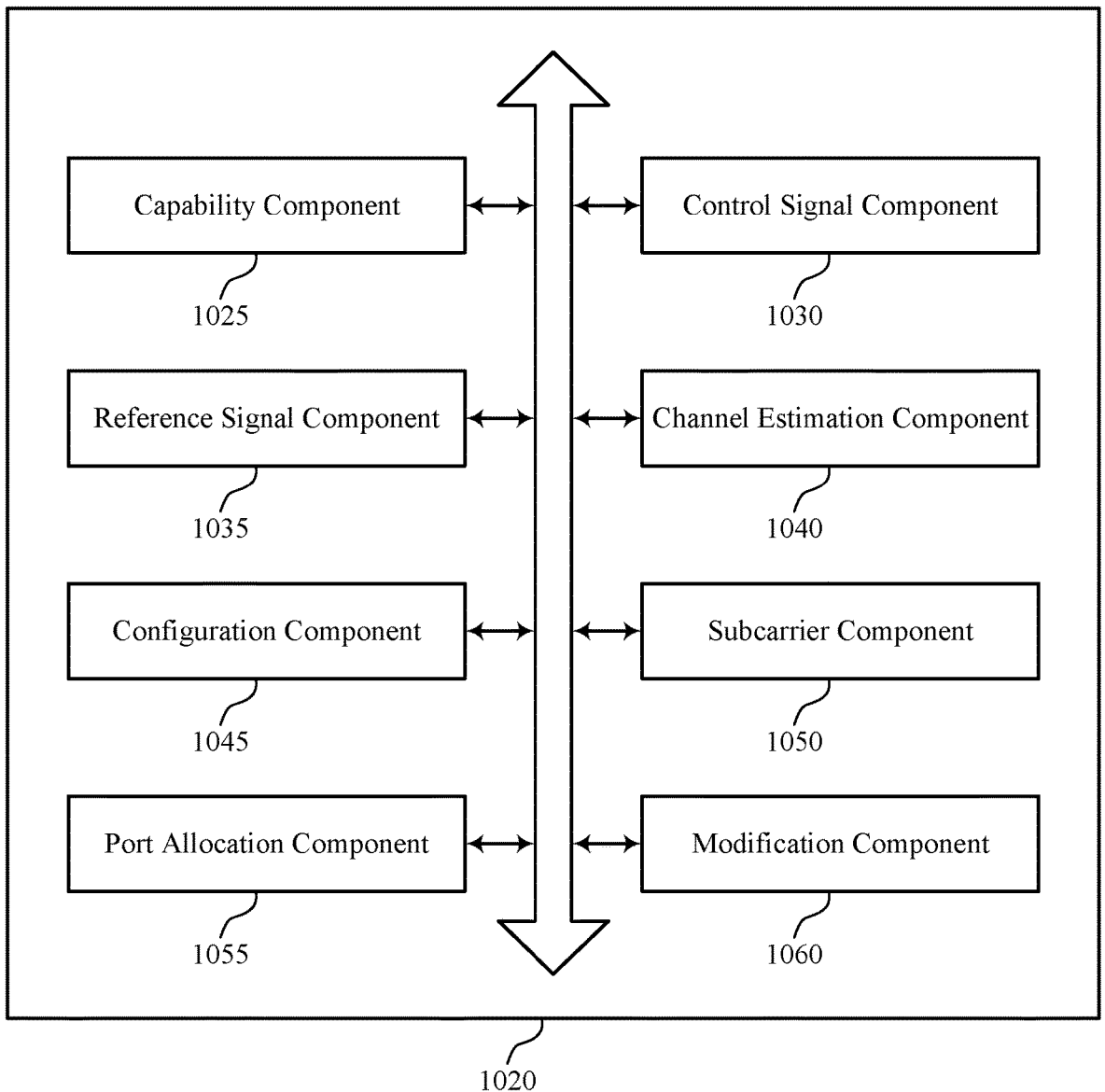
FIG. 10 shows a block diagram of a communications manager that supports reference signal formation for PRGs in accordance with one or more aspects of the present disclosure.

FIG. 10 shows a block diagram 1000 of a communications manager 1020 that supports reference signal formation for PRGs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reference signal formation for PRGs as described herein. For example, the communications manager 1020 may include a capability component 1025, a control signal component 1030, a reference signal component 1035, a channel estimation component 1040, a configuration component 1045, a subcarrier component 1050, a port allocation component 1055, a modification component 1060, or any combination thereof. Each of these components may communicate, directly or indirectly, with one another (e.g., via one or more buses).

The communications manager 1020 may support wireless communications at a UE in accordance with examples as disclosed herein. The capability component 1025 is capable of, configured to, or operable to support a means for transmitting a capability message indicating a capability of the UE to support a positioning scheme for one or more reference signals within a PRG for a channel estimation procedure. The control signal component 1030 is capable of, configured to, or operable to support a means for receiving, based on the capability message, a control signal indicating a frequency allocation for the one or more reference signals for the channel estimation procedure, the frequency allocation for the one or more reference signals being based on the positioning scheme supported by the UE. The reference signal component 1035 is capable of, configured to, or operable to support a means for receiving the one or more reference signals for the channel estimation procedure in accordance with the frequency allocation. The channel estimation component 1040 is capable of, configured to, or operable to support a means for performing the channel estimation procedure using the one or more reference signals based on the PRG associated with the channel estimation procedure.

In some examples, to support receiving the control signal, the configuration component 1045 is capable of, configured to, or operable to support a means for receiving an indication of a reference signal configuration including at least one of a modified reference signal, a type of reference signal, a PRG allocation, or a combination thereof, where performing the channel estimation procedure is based on the reference signal configuration.

In some examples, the subcarrier component 1050 is capable of, configured to, or operable to support a means for receiving a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is separated by two subcarriers.

In some examples, the subcarrier component 1050 is capable of, configured to, or operable to support a means for receiving a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is received via adjacent subcarriers of the PRG.

In some examples, the subcarrier component 1050 is capable of, configured to, or operable to support a means for receiving a first reference signal via a first subcarrier of the PRG and a second reference signal via a last subcarrier of the PRG, where the first reference signal and the second reference signal are associated with an OCC.

In some examples, a first symbol associated with the first reference signal and a second symbol associated with the second reference signal are mapped to a pair of ports.

In some examples, the reference signal component 1035 is capable of, configured to, or operable to support a means for receiving the one or more reference signals via each subcarrier of the PRG, where each resource element of the PRG includes an OCC associated with three or more ports of a constellation.

In some examples, the reference signal component 1035 is capable of, configured to, or operable to support a means for receiving a first reference signal via a first resource element of the PRG and a second reference signal via a last resource element of the PRG, where the first resource element and the last resource element each includes OCCs associated with three or more ports and remaining resource elements of the PRG include OCCs associated with at least a pair of ports.

In some examples, the reference signal component 1035 is capable of, configured to, or operable to support a means for receiving a first reference signal via first two resource elements of the PRG and a second reference signal via last two resource elements of the PRG, where the first two resource elements and the last two resource elements each includes OCCs associated with up to six ports.

In some examples, the port allocation component 1055 is capable of, configured to, or operable to support a means for receiving an indication to modify one or more port allocations of the PRG. In some examples, the modification component 1060 is capable of, configured to, or operable to support a means for performing a modification of the one or more port allocations of the PRG based on receiving the indication, where receiving the one or more reference signals is based on performing the modification of the one or more port allocations.

In some examples, the positioning scheme is based on a resource partition size for the PRG associated with the channel estimation procedure.

In some examples, the one or more reference signals include one or more demodulation reference signals.

Figure 11:
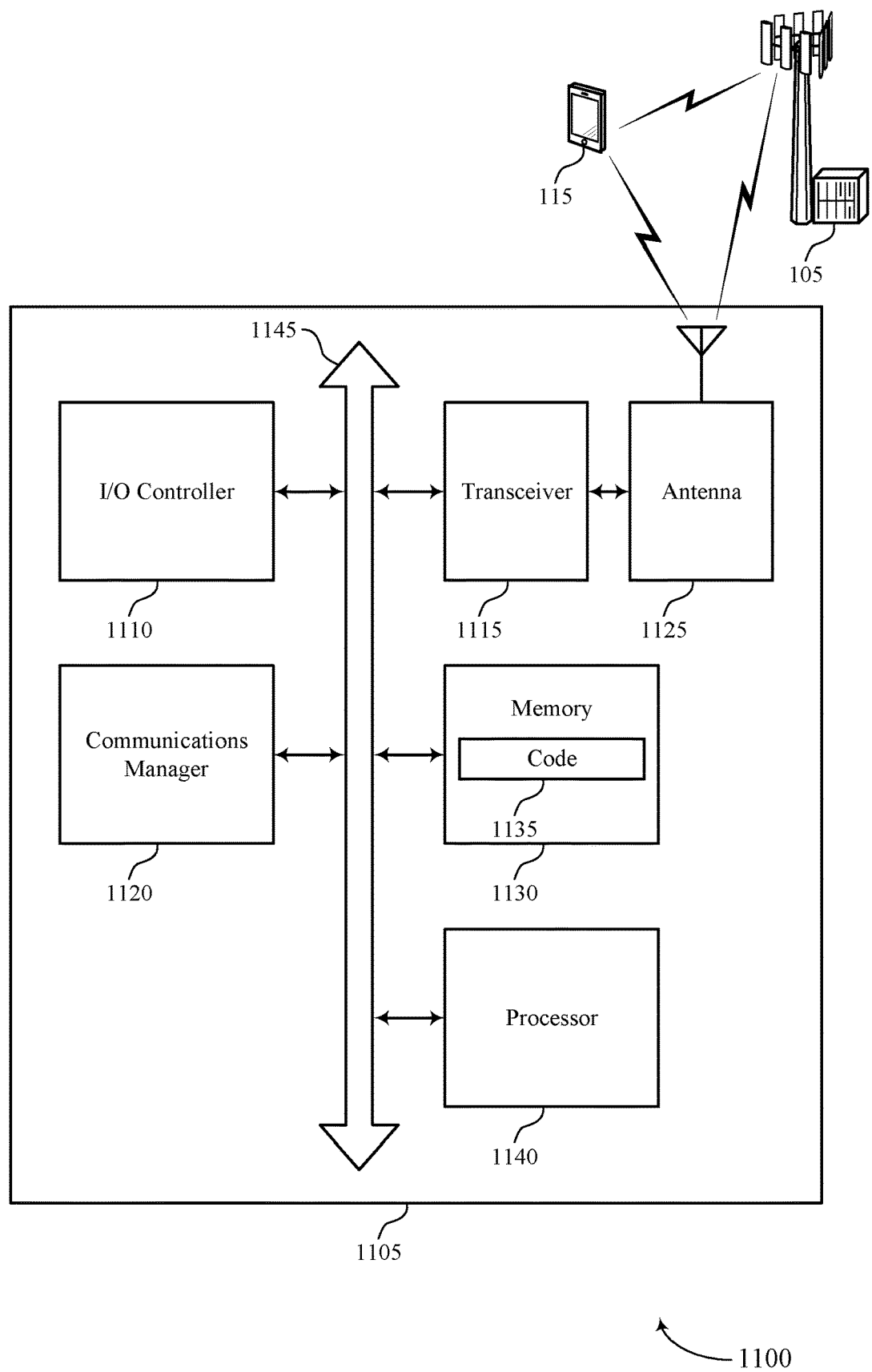
FIG. 11 shows a diagram of a system including a device that supports reference signal formation for PRGs in accordance with one or more aspects of the present disclosure.

FIG. 11 shows a diagram of a system 1100 including a device 1105 that supports reference signal formation for PRGs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reference signal formation for PRGs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 is capable of, configured to, or operable to support a means for transmitting a capability message indicating a capability of the UE to support a positioning scheme for one or more reference signals within a PRG for a channel estimation procedure. The communications manager 1120 is capable of, configured to, or operable to support a means for receiving, based on the capability message, a control signal indicating a frequency allocation for the one or more reference signals for the channel estimation procedure, the frequency allocation for the one or more reference signals being based on the positioning scheme supported by the UE. The communications manager 1120 is capable of, configured to, or operable to support a means for receiving the one or more reference signals for the channel estimation procedure in accordance with the frequency allocation. The communications manager 1120 is capable of, configured to, or operable to support a means for performing the channel estimation procedure using the one or more reference signals based on the PRG associated with the channel estimation procedure.

By including or configuring the communications manager 1120 in accordance with examples as described herein, the device 1105 may support techniques for improved channel estimation quality and improved data throughput.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reference signal formation for PRGs as described herein, or the processor 1140 and the memory 1130 may be otherwise configured to perform or support such operations.

Figure 12:
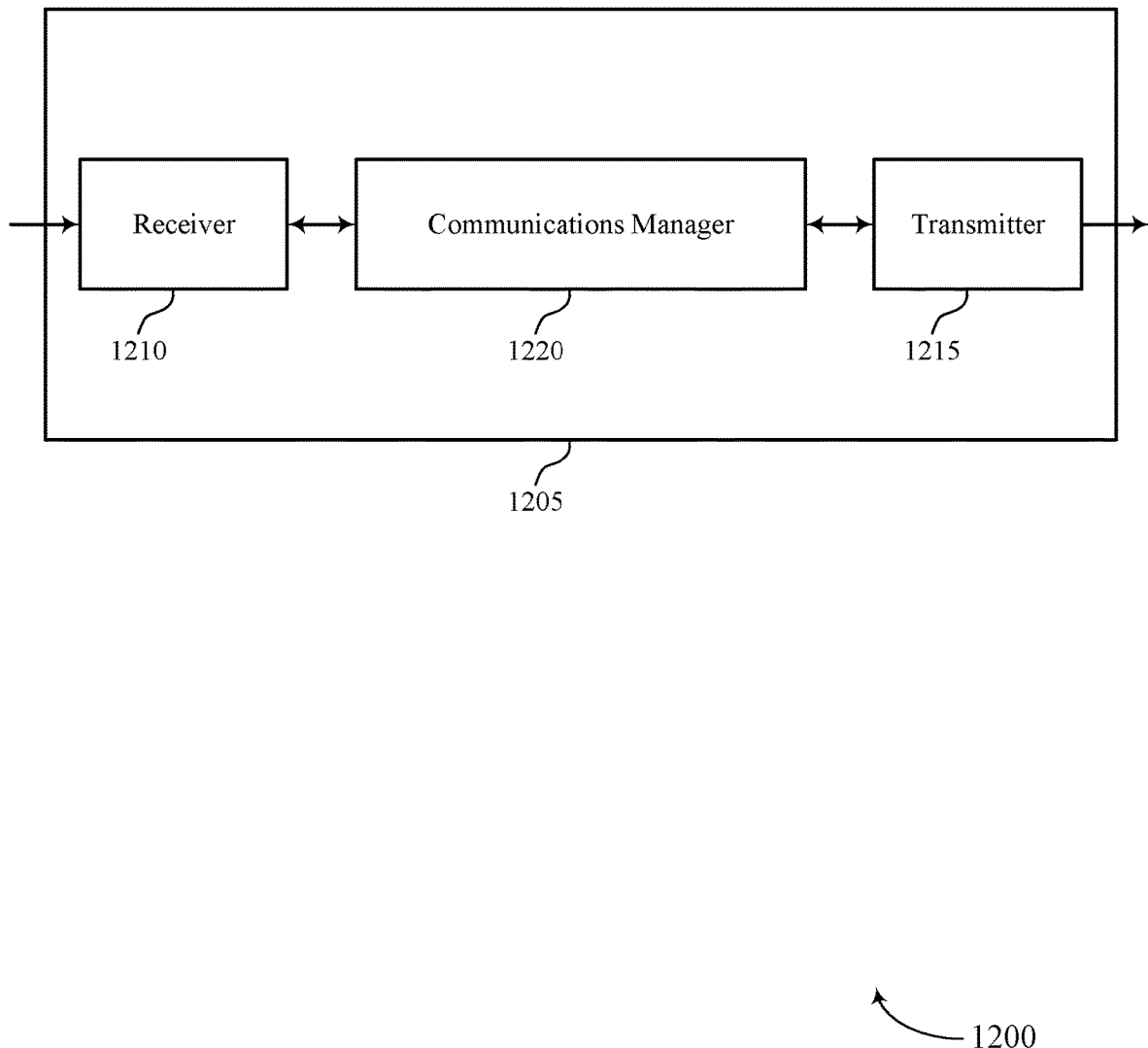
FIGS. 12 and 13 show block diagrams of devices that support reference signal formation for PRGs in accordance with one or more aspects of the present disclosure.

FIG. 12 shows a block diagram 1200 of a device 1205 that supports reference signal formation for PRGs in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of reference signal formation for PRGs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry), software (e.g., executed by a processor), or any combination thereof. The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the at least one processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software) executed by a processor. If implemented in code executed by a processor, the functions of the communications manager 1220, the receiver 1210, the transmitter 1215, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 is capable of, configured to, or operable to support a means for receiving, to a UE, a capability message indicating a capability of the UE to support a positioning scheme for one or more reference signals within a PRG for a channel estimation procedure. The communications manager 1220 is capable of, configured to, or operable to support a means for transmitting, based on the capability message, a control signal indicating a frequency allocation for the one or more reference signals for the channel estimation procedure, the frequency allocation for the one or more reference signals being based on the positioning scheme supported by the UE. The communications manager 1220 is capable of, configured to, or operable to support a means for transmitting the one or more reference signals for the channel estimation procedure in accordance with the frequency allocation.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for improved channel estimation quality and improved data throughput.

Figure 13:
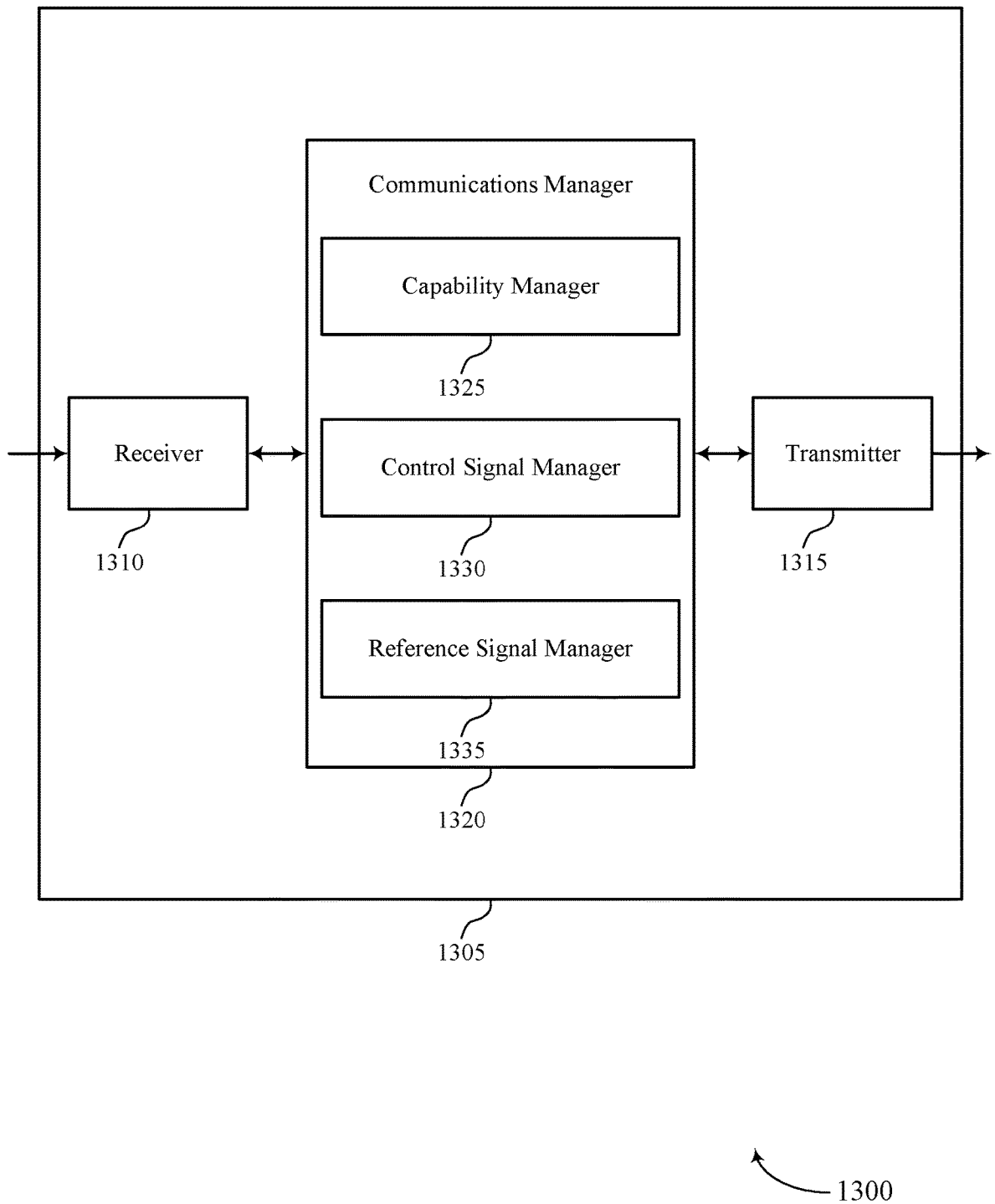

FIG. 13 shows a block diagram 1300 of a device 1305 that supports reference signal formation for PRGs in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of reference signal formation for PRGs as described herein. For example, the communications manager 1320 may include a capability manager 1325, a control signal manager 1330, a reference signal manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The capability manager 1325 is capable of, configured to, or operable to support a means for receiving, to a UE, a capability message indicating a capability of the UE to support a positioning scheme for one or more reference signals within a PRG for a channel estimation procedure. The control signal manager 1330 is capable of, configured to, or operable to support a means for transmitting, based on the capability message, a control signal indicating a frequency allocation for the one or more reference signals for the channel estimation procedure, the frequency allocation for the one or more reference signals being based on the positioning scheme supported by the UE. The reference signal manager 1335 is capable of, configured to, or operable to support a means for transmitting the one or more reference signals for the channel estimation procedure in accordance with the frequency allocation.

Figure 14:
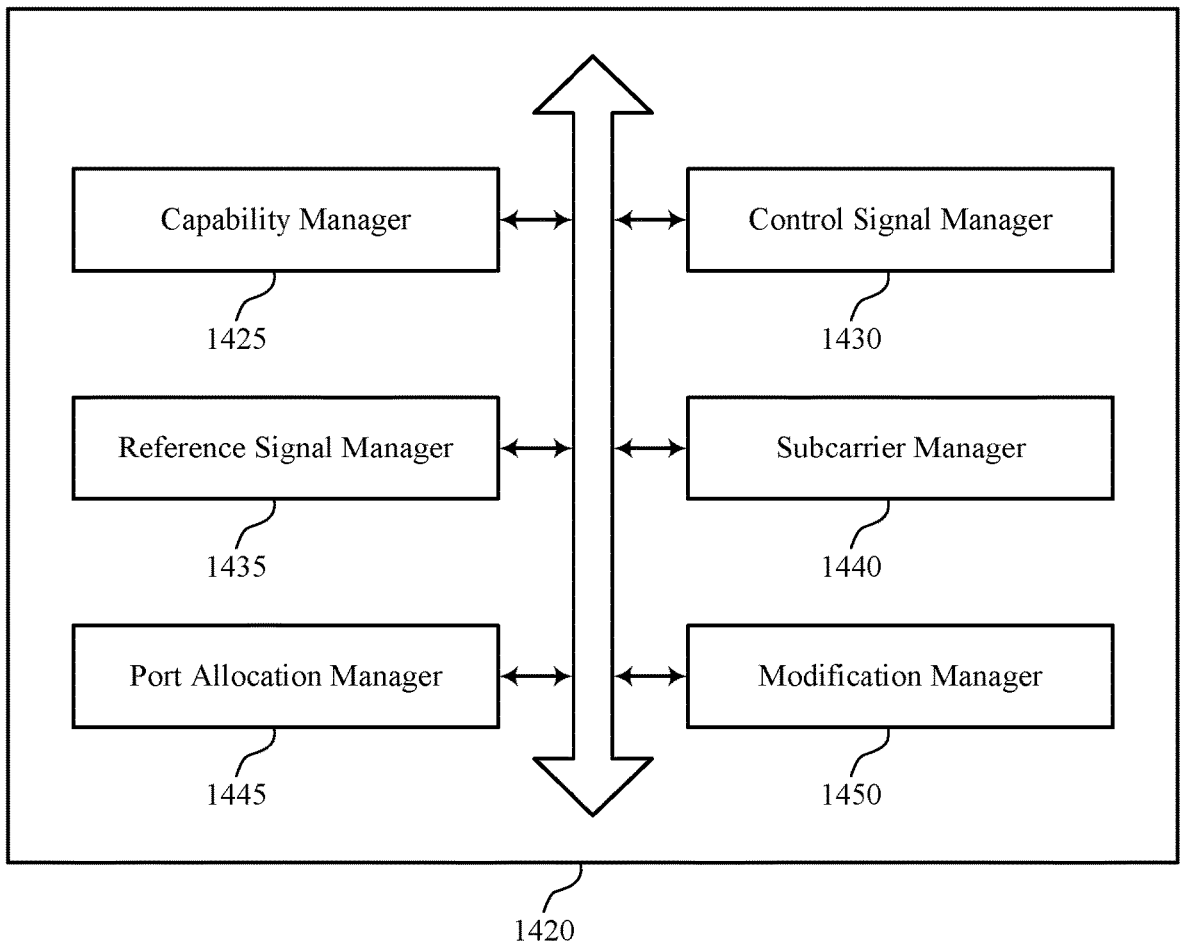
FIG. 14 shows a block diagram of a communications manager that supports reference signal formation for PRGs in accordance with one or more aspects of the present disclosure.

FIG. 14 shows a block diagram 1400 of a communications manager 1420 that supports reference signal formation for PRGs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of reference signal formation for PRGs as described herein. For example, the communications manager 1420 may include a capability manager 1425, a control signal manager 1430, a reference signal manager 1435, a subcarrier manager 1440, a port allocation manager 1445, a modification manager 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The capability manager 1425 is capable of, configured to, or operable to support a means for receiving, to a UE, a capability message indicating a capability of the UE to support a positioning scheme for one or more reference signals within a PRG for a channel estimation procedure. The control signal manager 1430 is capable of, configured to, or operable to support a means for transmitting, based on the capability message, a control signal indicating a frequency allocation for the one or more reference signals for the channel estimation procedure, the frequency allocation for the one or more reference signals being based on the positioning scheme supported by the UE. The reference signal manager 1435 is capable of, configured to, or operable to support a means for transmitting the one or more reference signals for the channel estimation procedure in accordance with the frequency allocation.

In some examples, to support transmitting the control signal, the reference signal manager 1435 is capable of, configured to, or operable to support a means for transmitting an indication of a reference signal configuration including at least one of a modified reference signal, a type of reference signal, a PRG allocation, or a combination thereof, where the channel estimation procedure is based on the reference signal configuration.

In some examples, the reference signal manager 1435 is capable of, configured to, or operable to support a means for transmitting a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is separated by two subcarriers.

In some examples, the reference signal manager 1435 is capable of, configured to, or operable to support a means for transmitting a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is received via adjacent subcarriers of the PRG.

In some examples, the subcarrier manager 1440 is capable of, configured to, or operable to support a means for transmitting a first reference signal via a first subcarrier of the PRG and a second reference signal via a last subcarrier of the PRG, where the first reference signal and the second reference signal are associated with an OCC.

In some examples, a first symbol associated with the first reference signal and a second symbol associated with the second reference signal are mapped to a pair of ports.

In some examples, the subcarrier manager 1440 is capable of, configured to, or operable to support a means for transmitting the one or more reference signals via each subcarrier of the PRG, where each resource element of the PRG includes an OCC associated with three or more ports of a constellation.

In some examples, the reference signal manager 1435 is capable of, configured to, or operable to support a means for transmitting a first reference signal via a first resource element of the PRG and a second reference signal via a last resource element of the PRG, where the first resource element and the last resource element each includes OCCs associated with three or more ports and remaining resource elements of the PRG include OCCs associated with at least a pair of ports.

In some examples, the reference signal manager 1435 is capable of, configured to, or operable to support a means for transmitting a first reference signal via first two resource elements of the PRG and a second reference signal via last two resource elements of the PRG, where the first two resource elements and the last two resource elements each includes OCCs associated with up to six ports.

In some examples, the port allocation manager 1445 is capable of, configured to, or operable to support a means for performing a modification of one or more port allocations of the PRG. In some examples, the modification manager 1450 is capable of, configured to, or operable to support a means for transmitting an indication of the modification of the one or more port allocations based on performing the modification, where transmitting the one or more reference signals is based on the modification of the one or more port allocations.

In some examples, the positioning scheme is based on a resource partition size for the PRG associated with the channel estimation procedure.

In some examples, the one or more reference signals include one or more demodulation reference signals.

Figure 15:
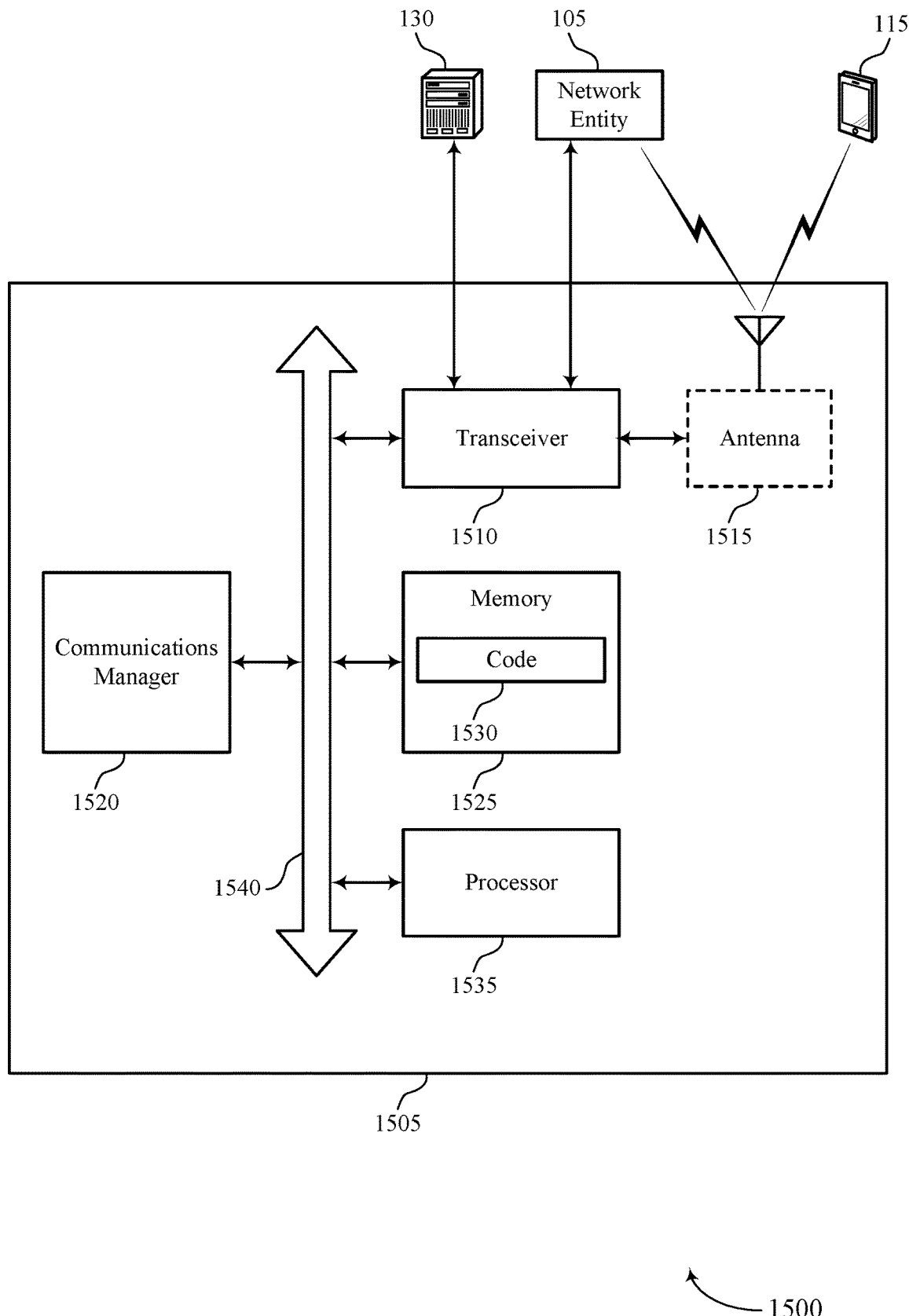
FIG. 15 shows a diagram of a system including a device that supports reference signal formation for PRGs in accordance with one or more aspects of the present disclosure.

FIG. 15 shows a diagram of a system 1500 including a device 1505 that supports reference signal formation for PRGs in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting reference signal formation for PRGs). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 is capable of, configured to, or operable to support a means for receiving, to a UE, a capability message indicating a capability of the UE to support a positioning scheme for one or more reference signals within a PRG for a channel estimation procedure. The communications manager 1520 is capable of, configured to, or operable to support a means for transmitting, based on the capability message, a control signal indicating a frequency allocation for the one or more reference signals for the channel estimation procedure, the frequency allocation for the one or more reference signals being based on the positioning scheme supported by the UE. The communications manager 1520 is capable of, configured to, or operable to support a means for transmitting the one or more reference signals for the channel estimation procedure in accordance with the frequency allocation.

By including or configuring the communications manager 1520 in accordance with examples as described herein, the device 1505 may support techniques for improved channel estimation quality and improved data throughput.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of reference signal formation for PRGs as described herein, or the processor 1535 and the memory 1525 may be otherwise configured to perform or support such operations.

Figure 16:
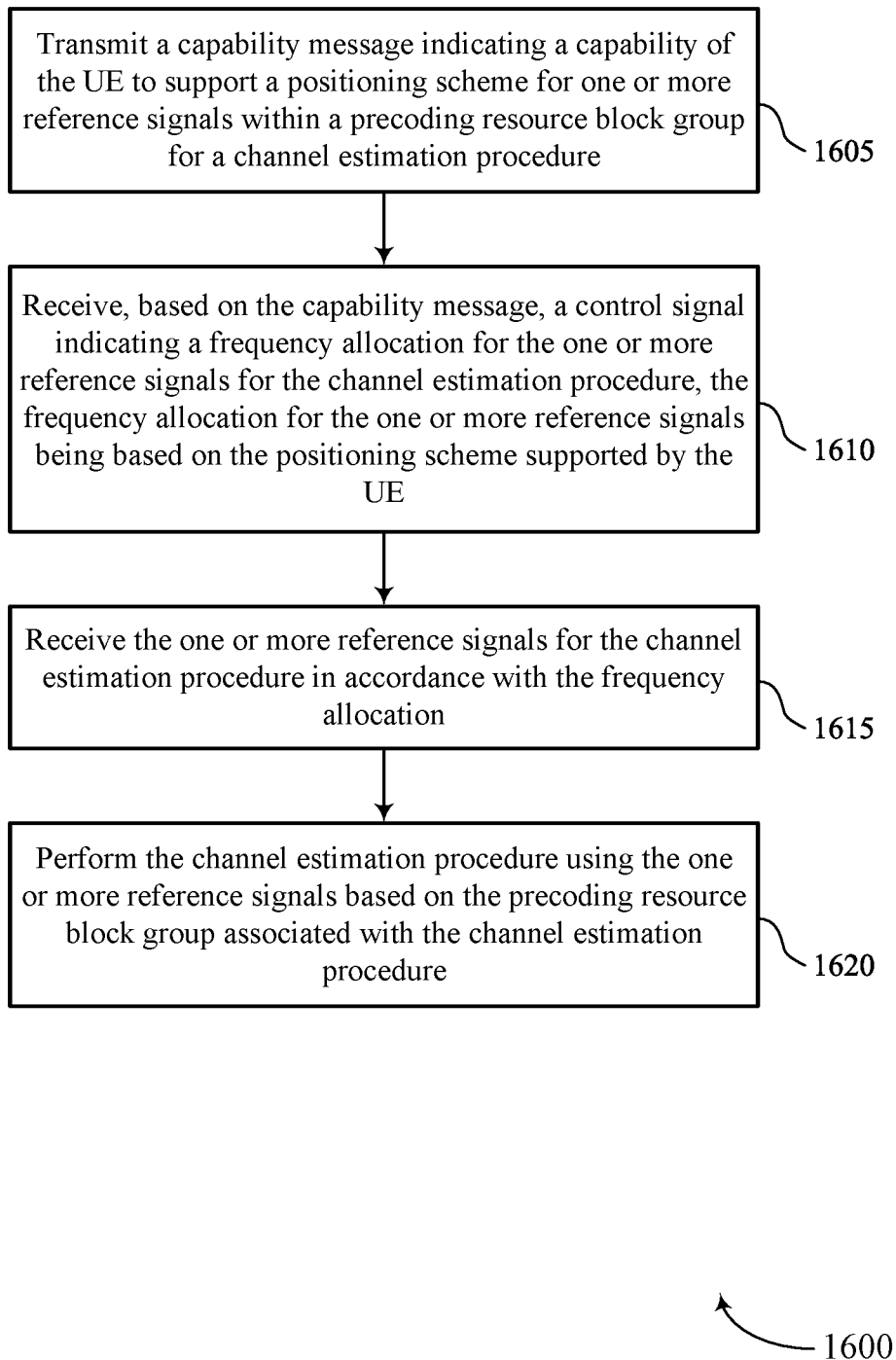
FIGS. 16 through 19 show flowcharts illustrating methods that support reference signal formation for PRGs in accordance with one or more aspects of the present disclosure.

FIG. 16 shows a flowchart illustrating a method 1600 that supports reference signal formation for PRGs in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1605, the method may include transmitting a capability message indicating a capability of the UE to support a positioning scheme for one or more reference signals within a PRG for a channel estimation procedure. The operations of 1605 may be performed in accordance with examples as disclosed herein. In some examples, aspects of the operations of 1605 may be performed by a capability component 1025 as described with reference to FIG. 10.

At 1610, the method may include receiving, based on the capability message, a control signal indicating a frequency allocation for the one or more reference signals for the channel estimation procedure, the frequency allocation for the one or more reference signals being based on the positioning scheme supported by the UE. The operations of 1610 may be performed in accordance with examples as disclosed herein. In some examples, aspects of the operations of 1610 may be performed by a control signal component 1030 as described with reference to FIG. 10.

At 1615, the method may include receiving the one or more reference signals for the channel estimation procedure in accordance with the frequency allocation. The operations of 1615 may be performed in accordance with examples as disclosed herein. In some examples, aspects of the operations of 1615 may be performed by a reference signal component 1035 as described with reference to FIG. 10.

At 1620, the method may include performing the channel estimation procedure using the one or more reference signals based on the PRG associated with the channel estimation procedure. The operations of 1620 may be performed in accordance with examples as disclosed herein. In some examples, aspects of the operations of 1620 may be performed by a channel estimation component 1040 as described with reference to FIG. 10.

Figure 17:
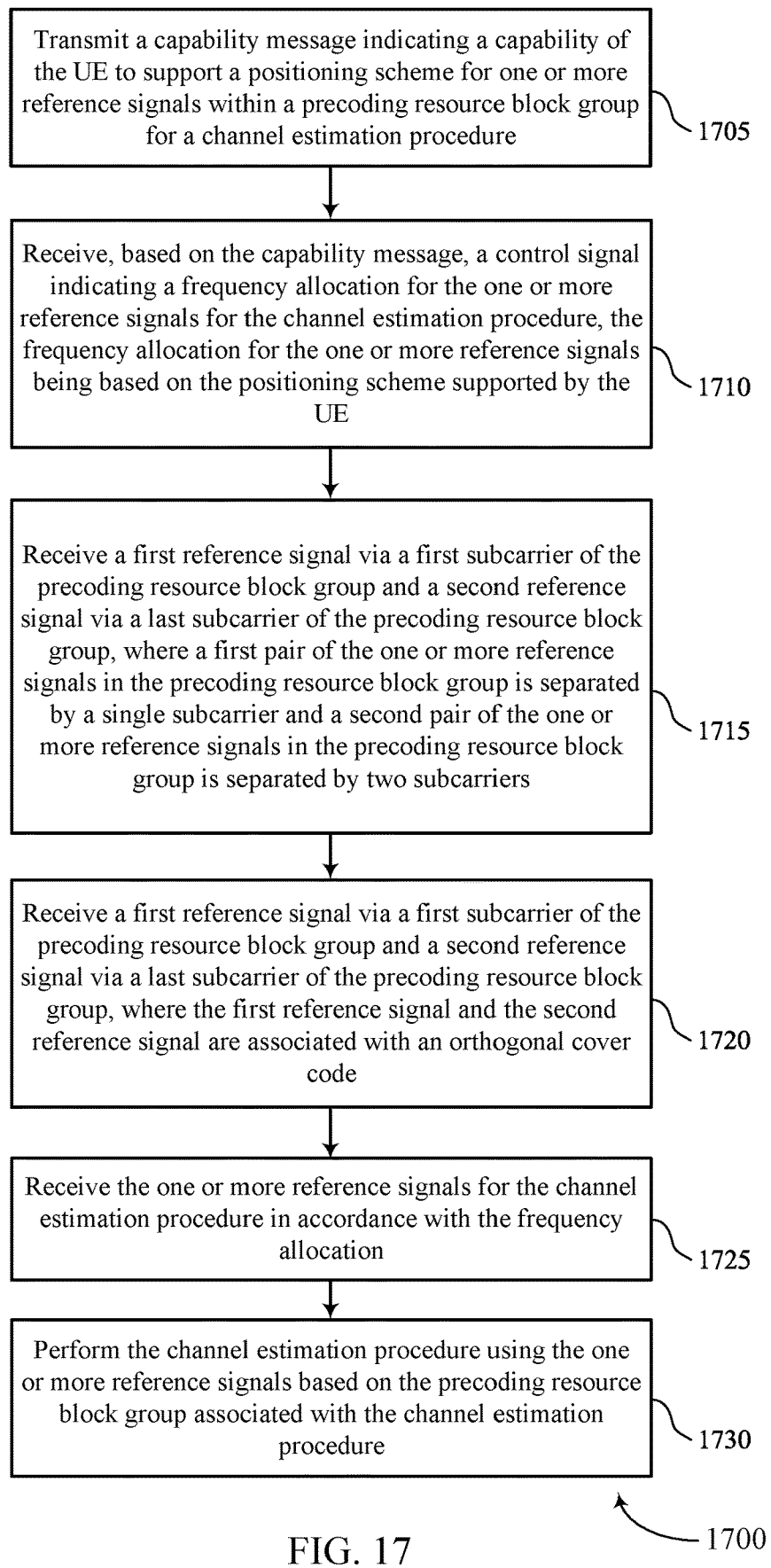

FIG. 17 shows a flowchart illustrating a method 1700 that supports reference signal formation for PRGs in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the wireless UE to perform the described functions. Additionally, or alternatively, the wireless UE may perform aspects of the described functions using special-purpose hardware.

At 1705, the method may include transmitting a capability message indicating a capability of the UE to support a positioning scheme for one or more reference signals within a PRG for a channel estimation procedure. The operations of 1705 may be performed in accordance with examples as disclosed herein. In some examples, aspects of the operations of 1705 may be performed by a capability component 1025 as described with reference to FIG. 10.

At 1710, the method may include receiving, based on the capability message, a control signal indicating a frequency allocation for the one or more reference signals for the channel estimation procedure, the frequency allocation for the one or more reference signals being based on the positioning scheme supported by the UE. The operations of 1710 may be performed in accordance with examples as disclosed herein. In some examples, aspects of the operations of 1710 may be performed by a control signal component 1030 as described with reference to FIG. 10.

At 1715, the method may include receiving a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is separated by two subcarriers. The operations of 1715 may be performed in accordance with examples as disclosed herein. In some examples, aspects of the operations of 1715 may be performed by a subcarrier component 1050 as described with reference to FIG. 10.

At 1720, the method may include receiving a first reference signal via a first subcarrier of the PRG and a second reference signal via a last subcarrier of the PRG, where the first reference signal and the second reference signal are associated with an OCC. The operations of 1720 may be performed in accordance with examples as disclosed herein. In some examples, aspects of the operations of 1720 may be performed by a subcarrier component 1050 as described with reference to FIG. 10.

At 1725, the method may include receiving the one or more reference signals for the channel estimation procedure in accordance with the frequency allocation. The operations of 1725 may be performed in accordance with examples as disclosed herein. In some examples, aspects of the operations of 1725 may be performed by a reference signal component 1035 as described with reference to FIG. 10.

At 1730, the method may include performing the channel estimation procedure using the one or more reference signals based on the PRG associated with the channel estimation procedure. The operations of 1730 may be performed in accordance with examples as disclosed herein. In some examples, aspects of the operations of 1730 may be performed by a channel estimation component 1040 as described with reference to FIG. 10.

Figure 18:
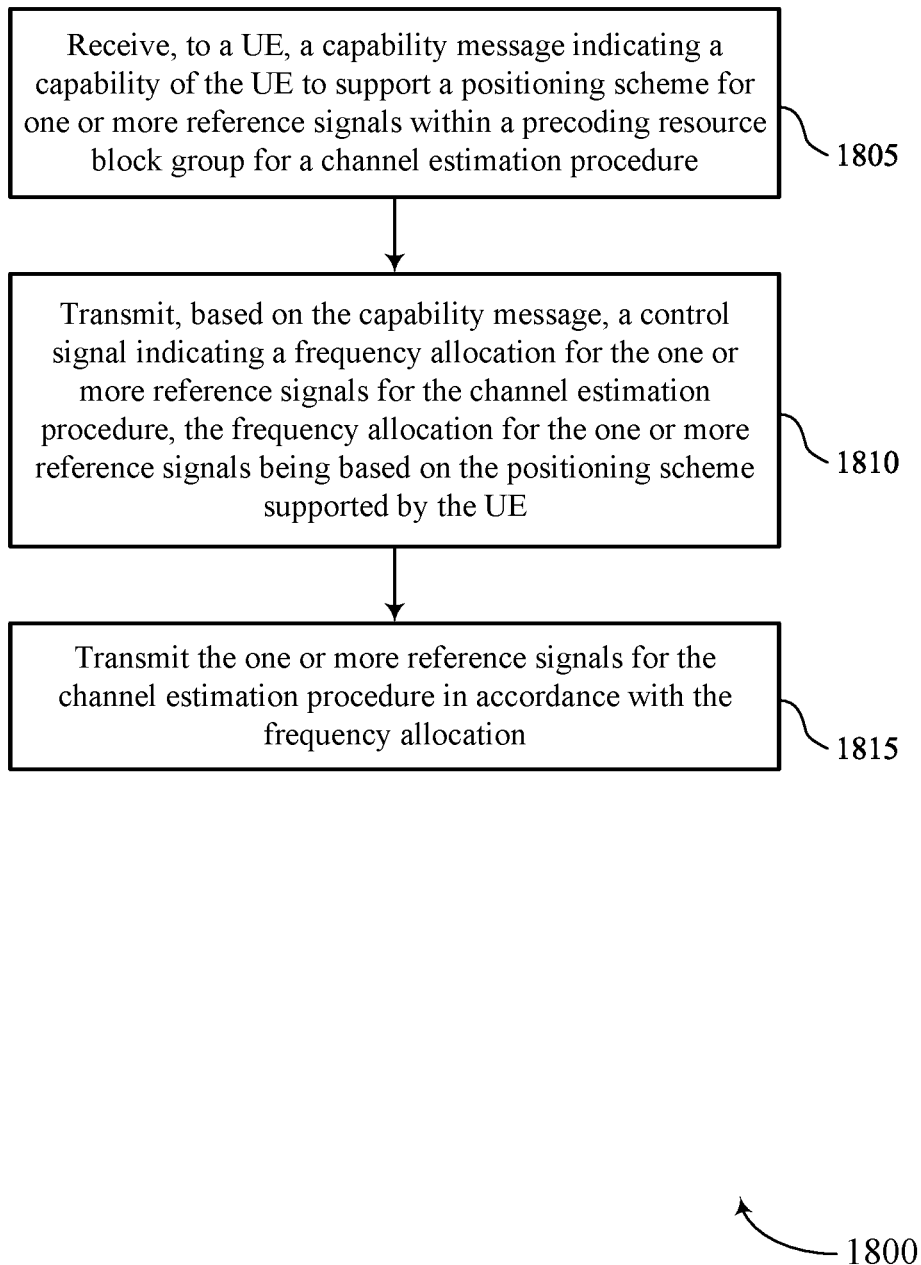

FIG. 18 shows a flowchart illustrating a method 1800 that supports reference signal formation for PRGs in accordance with aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include receiving, to a UE, a capability message indicating a capability of the UE to support a positioning scheme for one or more reference signals within a PRG for a channel estimation procedure. The operations of 1805 may be performed in accordance with examples as disclosed herein. In some examples, aspects of the operations of 1805 may be performed by a capability manager 1425 as described with reference to FIG. 14.

At 1810, the method may include transmitting, based on the capability message, a control signal indicating a frequency allocation for the one or more reference signals for the channel estimation procedure, the frequency allocation for the one or more reference signals being based on the positioning scheme supported by the UE. The operations of 1810 may be performed in accordance with examples as disclosed herein. In some examples, aspects of the operations of 1810 may be performed by a control signal manager 1430 as described with reference to FIG. 14.

At 1815, the method may include transmitting the one or more reference signals for the channel estimation procedure in accordance with the frequency allocation. The operations of 1815 may be performed in accordance with examples as disclosed herein. In some examples, aspects of the operations of 1815 may be performed by a reference signal manager 1435 as described with reference to FIG. 14.

Figure 19:
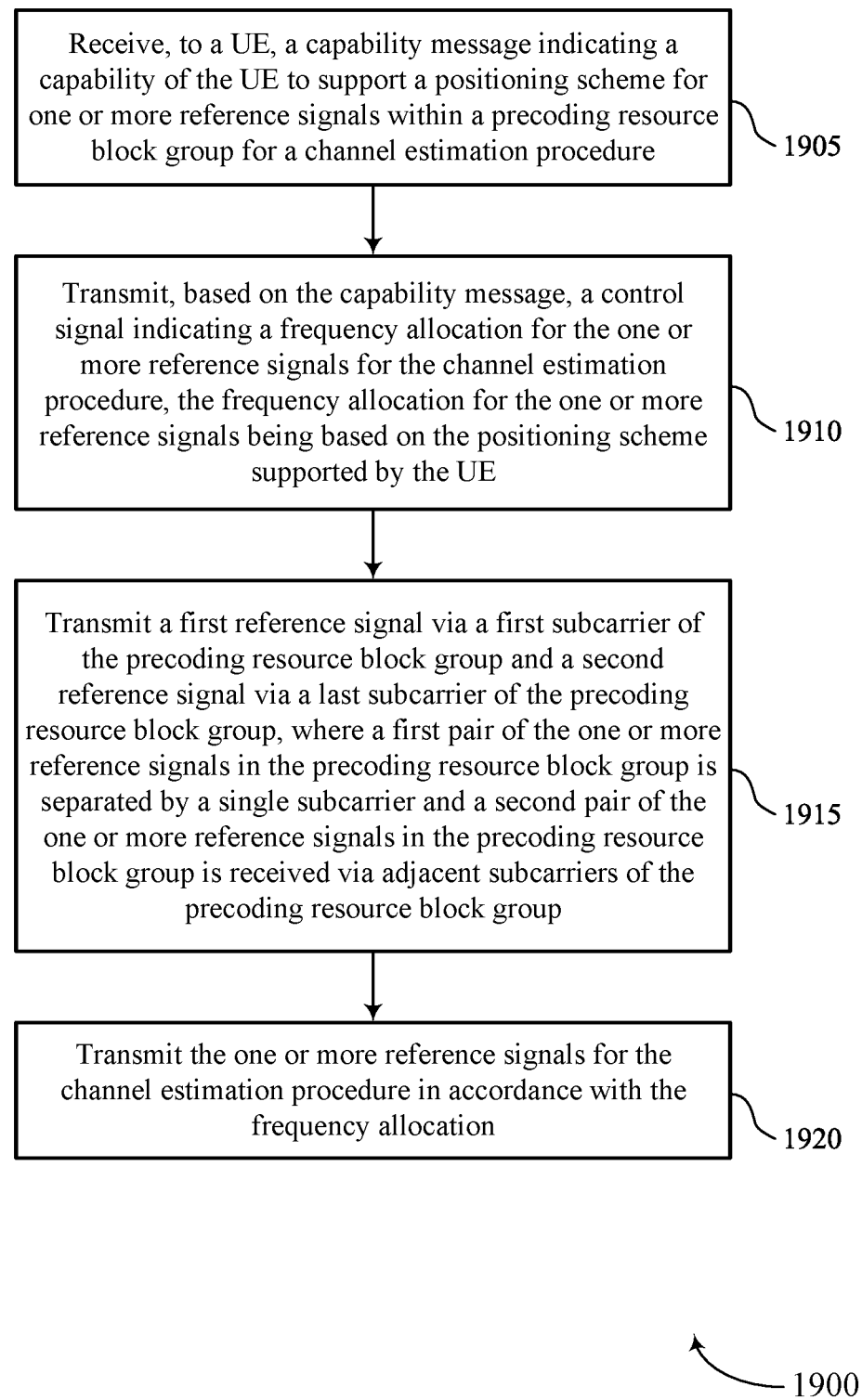

FIG. 19 shows a flowchart illustrating a method 1900 that supports reference signal formation for PRGs in accordance with aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include receiving, to a UE, a capability message indicating a capability of the UE to support a positioning scheme for one or more reference signals within a PRG for a channel estimation procedure. The operations of 1905 may be performed in accordance with examples as disclosed herein. In some examples, aspects of the operations of 1905 may be performed by a capability manager 1425 as described with reference to FIG. 14.

At 1910, the method may include transmitting, based on the capability message, a control signal indicating a frequency allocation for the one or more reference signals for the channel estimation procedure, the frequency allocation for the one or more reference signals being based on the positioning scheme supported by the UE. The operations of 1910 may be performed in accordance with examples as disclosed herein. In some examples, aspects of the operations of 1910 may be performed by a control signal manager 1430 as described with reference to FIG. 14.

At 1915, the method may include transmitting a first reference signal via a first subcarrier of the PRG and a second reference signal via a last subcarrier of the PRG, where a first pair of the one or more reference signals in the PRG is separated by a single subcarrier and a second pair of the one or more reference signals in the PRG is received via adjacent subcarriers of the PRG. The operations of 1915 may be performed in accordance with examples as disclosed herein. In some examples, aspects of the operations of 1915 may be performed by a reference signal manager 1435 as described with reference to FIG. 14.

At 1920, the method may include transmitting the one or more reference signals for the channel estimation procedure in accordance with the frequency allocation. The operations of 1920 may be performed in accordance with examples as disclosed herein. In some examples, aspects of the operations of 1920 may be performed by a reference signal manager 1435 as described with reference to FIG. 14.

The following provides an overview of aspects of the present disclosure:

Aspect 1: A method for wireless communications at a UE, comprising: transmitting a capability message indicating a capability of the UE to support a positioning scheme for one or more reference signals within a PRG for a channel estimation procedure; receiving, based at least in part on the capability message, a control signal indicating a frequency allocation for the one or more reference signals for the channel estimation procedure, the frequency allocation for the one or more reference signals being based at least in part on the positioning scheme supported by the UE; receiving the one or more reference signals for the channel estimation procedure in accordance with the frequency allocation; and performing the channel estimation procedure using the one or more reference signals based at least in part on the PRG associated with the channel estimation procedure.

Aspect 2: The method of aspect 1, wherein receiving the control signal comprises: receiving an indication of a reference signal configuration comprising at least one of a modified reference signal, a type of reference signal, a PRG allocation, or a combination thereof, wherein performing the channel estimation procedure is based at least in part on the reference signal configuration.

Aspect 3: The method of any of aspects 1 through 2, further comprising: receiving a first reference signal via a first subcarrier of the PRG and a second reference signal via a last subcarrier of the PRG, wherein a first pair of the one or more reference signals in the PRG is separated by a single subcarrier and a second pair of the one or more reference signals in the PRG is separated by two subcarriers.

Aspect 4: The method of any of aspects 1 through 3, further comprising: receiving a first reference signal via a first subcarrier of the PRG and a second reference signal via a last subcarrier of the PRG, wherein a first pair of the one or more reference signals in the PRG is separated by a single subcarrier and a second pair of the one or more reference signals in the PRG is received via adjacent subcarriers of the PRG.

Aspect 5: The method of any of aspects 1 through 4, further comprising: receiving a first reference signal via a first subcarrier of the PRG and a second reference signal via a last subcarrier of the PRG, wherein the first reference signal and the second reference signal are associated with an OCC.

Aspect 6: The method of aspect 5, wherein a first symbol associated with the first reference signal and a second symbol associated with the second reference signal are mapped to a pair of ports.

Aspect 7: The method of any of aspects 1 through 6, further comprising: receiving the one or more reference signals via each subcarrier of the PRG, wherein each resource element of the PRG comprises an OCC associated with three or more ports of a constellation.

Aspect 8: The method of any of aspects 1 through 7, further comprising: receiving a first reference signal via a first resource element of the PRG and a second reference signal via a last resource element of the PRG, wherein the first resource element and the last resource element each comprises OCCs associated with three or more ports and remaining resource elements of the PRG comprise OCCs associated with at least a pair of ports.

Aspect 9: The method of any of aspects 1 through 8, further comprising: receiving a first reference signal via first two resource elements of the PRG and a second reference signal via last two resource elements of the PRG, wherein the first two resource elements and the last two resource elements each comprises OCCs associated with up to six ports.

Aspect 10: The method of any of aspects 1 through 9, further comprising: receiving an indication to modify one or more port allocations of the PRG; and performing a modification of the one or more port allocations of the PRG based at least in part on receiving the indication, wherein receiving the one or more reference signals is based at least in part on performing the modification of the one or more port allocations.

Aspect 11: The method of any of aspects 1 through 10, wherein the positioning scheme is based at least in part on a resource partition size for the PRG associated with the channel estimation procedure.

Aspect 12: The method of any of aspects 1 through 11, wherein the one or more reference signals comprise one or more DMRS.

Aspect 13: A method for wireless communications at a network entity, comprising: receiving, to a UE, a capability message indicating a capability of the UE to support a positioning scheme for one or more reference signals within a PRG for a channel estimation procedure; transmitting, based at least in part on the capability message, a control signal indicating a frequency allocation for the one or more reference signals for the channel estimation procedure, the frequency allocation for the one or more reference signals being based at least in part on the positioning scheme supported by the UE; and transmitting the one or more reference signals for the channel estimation procedure in accordance with the frequency allocation.

Aspect 14: The method of aspect 13, wherein transmitting the control signal comprises: transmitting an indication of a reference signal configuration comprising at least one of a modified reference signal, a type of reference signal, a PRG allocation, or a combination thereof, wherein the channel estimation procedure is based at least in part on the reference signal configuration.

Aspect 15: The method of any of aspects 13 through 14, further comprising: transmitting a first reference signal via a first subcarrier of the PRG and a second reference signal via a last subcarrier of the PRG, wherein a first pair of the one or more reference signals in the PRG is separated by a single subcarrier and a second pair of the one or more reference signals in the PRG is separated by two subcarriers.

Aspect 16: The method of any of aspects 13 through 15, further comprising: transmitting a first reference signal via a first subcarrier of the PRG and a second reference signal via a last subcarrier of the PRG, wherein a first pair of the one or more reference signals in the PRG is separated by a single subcarrier and a second pair of the one or more reference signals in the PRG is received via adjacent subcarriers of the PRG.

Aspect 17: The method of any of aspects 13 through 16, further comprising: transmitting a first reference signal via a first subcarrier of the PRG and a second reference signal via a last subcarrier of the PRG, wherein the first reference signal and the second reference signal are associated with an OCC.

Aspect 18: The method of aspect 17, wherein a first symbol associated with the first reference signal and a second symbol associated with the second reference signal are mapped to a pair of ports.

Aspect 19: The method of any of aspects 13 through 18, further comprising: transmitting the one or more reference signals via each subcarrier of the PRG, wherein each resource element of the PRG comprises an OCC associated with three or more ports of a constellation.

Aspect 20: The method of any of aspects 13 through 19, further comprising: transmitting a first reference signal via a first resource element of the PRG and a second reference signal via a last resource element of the PRG, wherein the first resource element and the last resource element each comprises OCCs associated with three or more ports and remaining resource elements of the PRG comprise OCCs associated with at least a pair of ports.

Aspect 21: The method of any of aspects 13 through 20, further comprising: transmitting a first reference signal via first two resource elements of the PRG and a second reference signal via last two resource elements of the PRG, wherein the first two resource elements and the last two resource elements each comprises OCCs associated with up to six ports.

Aspect 22: The method of any of aspects 13 through 21, further comprising: performing a modification of one or more port allocations of the PRG; and transmitting an indication of the modification of the one or more port allocations based at least in part on performing the modification, wherein transmitting the one or more reference signals is based at least in part on the modification of the one or more port allocations.

Aspect 23: The method of any of aspects 13 through 22, wherein the positioning scheme is based at least in part on a resource partition size for the PRG associated with the channel estimation procedure.

Aspect 24: The method of any of aspects 13 through 23, wherein the one or more reference signals comprise one or more DMRS.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising a processor; memory coupled with the processor; and instructions stored in the memory and executable by the processor to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   memory coupled with the at least one processor, the memory storing instructions executable by the at least one processor to cause the UE to:
   transmit a capability message indicating a capability of the UE to support a positioning scheme for one or more reference signals within a precoding resource block group for a channel estimation procedure;
   receive, based at least in part on the capability message, a control signal indicating a frequency allocation for the one or more reference signals for the channel estimation procedure, the frequency allocation for the one or more reference signals being based at least in part on the positioning scheme supported by the UE;
receive the one or more reference signals for the channel estimation procedure in accordance with the frequency allocation; and
perform the channel estimation procedure using the one or more reference signals based at least in part on the precoding resource block group associated with the channel estimation procedure.

2. The apparatus of claim 1, wherein the instructions to receive the control signal are executable by the processor to cause the apparatus to:
receive an indication of a reference signal configuration comprising at least one of a modified reference signal, a type of reference signal, a precoding resource block group allocation, or a combination thereof, wherein performing the channel estimation procedure is based at least in part on the reference signal configuration.

3. The apparatus of claim 1, wherein the instructions are further executable by the processor to cause the apparatus to:
receive a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is separated by two subcarriers.

4. The apparatus of claim 1, wherein the instructions are further executable by the processor to cause the apparatus to:
receive a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is received via adjacent subcarriers of the precoding resource block group.

5. The apparatus of claim 1, wherein the instructions are further executable by the processor to cause the apparatus to:
receive a first reference signal via a first subcarrier of the precoding resource block group and a second reference signal via a last subcarrier of the precoding resource block group, wherein the first reference signal and the second reference signal are associated with an orthogonal cover code.

6. The apparatus of claim 5, wherein a first symbol associated with the first reference signal and a second symbol associated with the second reference signal are mapped to a pair of ports.

7. The apparatus of claim 1, wherein the instructions are further executable by the processor to cause the apparatus to:
receive the one or more reference signals via each subcarrier of the precoding resource block group, wherein each resource element of the precoding resource block group comprises an orthogonal cover code associated with three or more ports of a constellation.

8. The apparatus of claim 1, wherein the instructions are further executable by the processor to cause the apparatus to:
receive a first reference signal via a first resource element of the precoding resource block group and a second reference signal via a last resource element of the precoding resource block group, wherein the first resource element and the last resource element each comprises orthogonal cover codes associated with three or more ports and remaining resource elements of the precoding resource block group comprise orthogonal cover codes associated with at least a pair of ports.

9. The apparatus of claim 1, wherein the instructions are further executable by the processor to cause the apparatus to:
receive a first reference signal via first two resource elements of the precoding resource block group and a second reference signal via last two resource elements of the precoding resource block group, wherein the first two resource elements and the last two resource elements each comprises orthogonal cover codes associated with up to six ports.

10. The apparatus of claim 1, wherein the instructions are further executable by the processor to cause the apparatus to:
receive an indication to modify one or more port allocations of the precoding resource block group; and
perform a modification of the one or more port allocations of the precoding resource block group based at least in part on receiving the indication, wherein receiving the one or more reference signals is based at least in part on performing the modification of the one or more port allocations.

11. The apparatus of claim 1, wherein the positioning scheme is based at least in part on a resource partition size for the precoding resource block group associated with the channel estimation procedure.

12. The apparatus of claim 1, wherein:
the one or more reference signals comprise one or more demodulation reference signals.

13. An apparatus for wireless communications at a network entity, comprising:
at least one processor; and
memory coupled with the at least one processor, the memory storing instructions executable by the at least one processor to cause the network entity to:
receive, to a user equipment (UE), a capability message indicating a capability of the UE to support a positioning scheme for one or more reference signals within a precoding resource block group for a channel estimation procedure;
transmit, based at least in part on the capability message, a control signal indicating a frequency allocation for the one or more reference signals for the channel estimation procedure, the frequency allocation for the one or more reference signals being based at least in part on the positioning scheme supported by the UE; and
transmit the one or more reference signals for the channel estimation procedure in accordance with the frequency allocation.

14. The apparatus of claim 13, wherein the instructions to transmit the control signal are executable by the processor to cause the apparatus to:
transmit an indication of a reference signal configuration comprising at least one of a modified reference signal, a type of reference signal, a precoding resource block group allocation, or a combination thereof, wherein the channel estimation procedure is based at least in part on the reference signal configuration.

15. The apparatus of claim 13, wherein the instructions are further executable by the processor to cause the apparatus to:
transmit a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is separated by two subcarriers.

16. The apparatus of claim 13, wherein the instructions are further executable by the processor to cause the apparatus to:
transmit a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is received via adjacent subcarriers of the precoding resource block group.

17. The apparatus of claim 13, wherein the instructions are further executable by the processor to cause the apparatus to:
transmit a first reference signal via a first subcarrier of the precoding resource block group and a second reference signal via a last subcarrier of the precoding resource block group, wherein the first reference signal and the second reference signal are associated with an orthogonal cover code.

18. The apparatus of claim 17, wherein a first symbol associated with the first reference signal and a second symbol associated with the second reference signal are mapped to a pair of ports.

19. The apparatus of claim 13, wherein the instructions are further executable by the processor to cause the apparatus to:
transmit the one or more reference signals via each subcarrier of the precoding resource block group, wherein each resource element of the precoding resource block group comprises an orthogonal cover code associated with three or more ports of a constellation.

20. The apparatus of claim 13, wherein the instructions are further executable by the processor to cause the apparatus to:
transmit a first reference signal via a first resource element of the precoding resource block group and a second reference signal via a last resource element of the precoding resource block group, wherein the first resource element and the last resource element each comprises orthogonal cover codes associated with three or more ports and remaining resource elements of the precoding resource block group comprise orthogonal cover codes associated with at least a pair of ports.

21. The apparatus of claim 13, wherein the instructions are further executable by the processor to cause the apparatus to:
transmit a first reference signal via first two resource elements of the precoding resource block group and a second reference signal via last two resource elements of the precoding resource block group, wherein the first two resource elements and the last two resource elements each comprises orthogonal cover codes associated with up to six ports.

22. The apparatus of claim 13, wherein the instructions are further executable by the processor to cause the apparatus to:
perform a modification of one or more port allocations of the precoding resource block group; and
transmit an indication of the modification of the one or more port allocations based at least in part on performing the modification, wherein transmitting the one or more reference signals is based at least in part on the modification of the one or more port allocations.

23. The apparatus of claim 13, wherein the positioning scheme is based at least in part on a resource partition size for the precoding resource block group associated with the channel estimation procedure.

24. The apparatus of claim 13, wherein:
the one or more reference signals comprise one or more demodulation reference signals.

25. A method for wireless communications at a user equipment (UE), comprising:
transmitting a capability message indicating a capability of the UE to support a positioning scheme for one or more reference signals within a precoding resource block group for a channel estimation procedure;
receiving, based at least in part on the capability message, a control signal indicating a frequency allocation for the one or more reference signals for the channel estimation procedure, the frequency allocation for the one or more reference signals being based at least in part on the positioning scheme supported by the UE;
receiving the one or more reference signals for the channel estimation procedure in accordance with the frequency allocation; and
performing the channel estimation procedure using the one or more reference signals based at least in part on the precoding resource block group associated with the channel estimation procedure.

26. The method of claim 25, wherein receiving the control signal comprises:
receiving an indication of a reference signal configuration comprising at least one of a modified reference signal, a type of reference signal, a precoding resource block group allocation, or a combination thereof, wherein performing the channel estimation procedure is based at least in part on the reference signal configuration.

27. The method of claim 25, further comprising:
receiving a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is separated by two subcarriers.

28. The method of claim 25, further comprising:
receiving a first reference signal via a first subcarrier of the precoding resource block group and a second reference signal via a last subcarrier of the precoding resource block group, wherein a first pair of the one or more reference signals in the precoding resource block group is separated by a single subcarrier and a second pair of the one or more reference signals in the precoding resource block group is received via adjacent subcarriers of the precoding resource block group.

29. A method for wireless communications at a network entity, comprising:
receiving, to a user equipment (UE), a capability message indicating a capability of the UE to support a positioning scheme for one or more reference signals within a precoding resource block group for a channel estimation procedure;
transmitting, based at least in part on the capability message, a control signal indicating a frequency allocation for the one or more reference signals for the channel estimation procedure, the frequency allocation for the one or more reference signals being based at least in part on the positioning scheme supported by the UE; and transmitting the one or more reference signals for the channel estimation procedure in accordance with the frequency allocation.

30. The method of claim 29, wherein transmitting the control signal comprises:

transmitting an indication of a reference signal configuration comprising at least one of a modified reference signal, a type of reference signal, a precoding resource block group allocation, or a combination thereof, wherein the channel estimation procedure is based at least in part on the reference signal configuration.

* * * * *